US009146737B2

(12) United States Patent
Ceze et al.

(10) Patent No.: US 9,146,737 B2
(45) Date of Patent: Sep. 29, 2015

(54) SYSTEMS AND METHODS FOR FINDING CONCURRENCY ERRORS

(71) Applicant: University of Washington through its Center for Commercialization, Seattle, WA (US)

(72) Inventors: Luis Ceze, Seattle, WA (US); Brandon Lucia, Seattle, WA (US)

(73) Assignee: University of Washington through its Center for Commercialization, Seattle, WA (US)

( * ) Notice: Subject to any disclaimer, the term of this patent is extended or adjusted under 35 U.S.C. 154(b) by 0 days.

(21) Appl. No.: 14/464,673

(22) Filed: Aug. 20, 2014

(65) Prior Publication Data

US 2014/0359577 A1    Dec. 4, 2014

Related U.S. Application Data

(62) Division of application No. 13/312,844, filed on Dec. 6, 2011, now Pat. No. 8,832,659.

(60) Provisional application No. 61/420,185, filed on Dec. 6, 2010.

(51) Int. Cl.
*G06F 9/44* (2006.01)
*G06F 11/36* (2006.01)

(52) U.S. Cl.
CPC *G06F 8/75* (2013.01); *G06F 8/314* (2013.01); *G06F 11/3688* (2013.01)

(58) Field of Classification Search
None
See application file for complete search history.

(56) References Cited

U.S. PATENT DOCUMENTS

| | | | |
|---|---|---|---|
| 6,851,075 B2 * | 2/2005 | Ur et al. | 714/36 |
| 7,028,119 B2 * | 4/2006 | Hue | 710/200 |
| 7,346,486 B2 * | 3/2008 | Ivancic et al. | 703/22 |
| 7,366,956 B2 * | 4/2008 | Karp et al. | 714/38.14 |
| 7,516,446 B2 * | 4/2009 | Choi et al. | 717/128 |
| 7,716,645 B2 * | 5/2010 | Dolby et al. | 717/126 |
| 7,784,035 B2 * | 8/2010 | Kahlon et al. | 717/133 |
| 7,844,959 B2 * | 11/2010 | Isard | 717/149 |
| 7,865,778 B2 * | 1/2011 | Duesterwald et al. | 714/38.1 |
| 7,984,429 B2 * | 7/2011 | Hunt | 717/130 |
| 8,201,142 B2 * | 6/2012 | Isard et al. | 717/106 |

(Continued)

OTHER PUBLICATIONS

Burckhardt, S., et al., "A Randomized Scheduler With Probabilistic Guarantees of Finding Bugs," Proceedings of the 15th Annual Conference on Architectural Support for Programming Languages and Operating Systems (ASPLOS '10), Pittsburgh, Pa., Mar. 13-17, 2010, 12 pages.

(Continued)

*Primary Examiner* — Isaac T Tecklu
(74) *Attorney, Agent, or Firm* — Christensen O'Connor Johnson Kindness PLLC

(57) ABSTRACT

Systems and methods for detecting concurrency bugs are provided. In some embodiments, context-aware communication graphs that represent inter-thread communication are collected during test runs, and may be labeled according to whether the test run was correct or failed. Graph edges that are likely to be associated with failed behavior are determined, and probable reconstructions of failed behavior are constructed to assist in debugging. In some embodiments, software instrumentation is used to collect the communication graphs. In some embodiments, hardware configured to collect the communication graphs is provided.

19 Claims, 18 Drawing Sheets

(56) References Cited

U.S. PATENT DOCUMENTS

| | | | |
|---|---|---|---|
| 8,356,287 B2* | 1/2013 | Tzoref et al. | 717/130 |
| 8,527,976 B2* | 9/2013 | Kahlon et al. | 717/152 |
| 8,578,342 B2* | 11/2013 | Artzi et al. | 717/131 |
| 8,813,038 B2* | 8/2014 | Erickson et al. | 717/126 |
| 2005/0183094 A1* | 8/2005 | Hunt | 719/315 |
| 2007/0169059 A1* | 7/2007 | Halambi et al. | 717/160 |
| 2008/0097941 A1* | 4/2008 | Agarwal | 706/12 |
| 2008/0201629 A1* | 8/2008 | Duesterwald et al. | 714/798 |
| 2008/0215768 A1* | 9/2008 | Reid et al. | 710/22 |
| 2009/0113399 A1* | 4/2009 | Tzoref et al. | 717/130 |
| 2009/0125887 A1* | 5/2009 | Kahlon et al. | 717/126 |
| 2009/0217303 A1* | 8/2009 | Grechanik et al. | 719/320 |
| 2011/0083123 A1* | 4/2011 | Lou et al. | 717/125 |
| 2011/0179399 A1* | 7/2011 | Bekiroglu et al. | 717/131 |
| 2012/0096441 A1* | 4/2012 | Law et al. | 717/127 |
| 2012/0102470 A1* | 4/2012 | Yang et al. | 717/130 |
| 2013/0014090 A1* | 1/2013 | Takahashi | 717/132 |

OTHER PUBLICATIONS

Flanagan, C., and S.N. Freund, "The RoadRunner Dynamic Analysis Framework for Concurrent Programs," Proceedings of the 9th ACM SIGPLAN-SIGSOFT Workshop on Program Analysis for Software Tools and Engineering (PASTE '10), Toronto, Jun. 5-6, 2010, 8 pages.

Flanagan, C., et al., "Velodrome: A Sound and Complete Dynamic Atomicity Checker for Multithreaded Programs," Proceedings of the ACM SIGPLAN Conference on Programming Language Design and Implementation (PLDI '08), Tucson, Ariz., Jun. 7-13, 2008, 11 pages.

Hammer, C., et al., "Dynamic Detection of Atomic-Set-Serializability Violations," 30th International Conference on Software Engineering (ICSE '08), Leipzig, Germany, May 10-18, 2008, 10 pages.

Kononenko, I., "Estimating Attributes: Analysis and Extensions of Relief," Proceedings of the European Conference on Machine Learning (ECML-94), Catania, Italy, Apr. 6-8, 1994, 12 pages.

Liblit, B.R., "Cooperative Bug Isolation," doctoral dissertation, University of California, Berkeley, Fall 2004, 172 pages.

Lu, S., et al., "AVIO: Detecting Atomicity Violations via Access Interleaving Invariants," Proceedings of the 12th International Conference on Architectural Support for Programming Languages and Operating Systems (ASPLOS '06), San Jose, Calif., Oct. 21-25, 2006, 12 pages.

Lucia, B., and L. Ceze, "Finding Concurrency Bugs with Context-Aware Communication Graphs," Proceedings of the 42nd Annual IEEE/ACM International Symposium on Microarchitecture (MICRO '09), New York, Dec. 12-16, 2009, 11 pages.

Luk, C.-K., et al., "Pin: Building Customized Program Analysis Tools with Dynamic Instrumentation," Proceedings of the ACM SIGPLAN Conference on Programming Language Design and Implementation (PLDI '05), Chicago, Jun. 11-15, 2005, 11 pages.

Musuvathi, M., et al., "Finding and Reproducing Heisenbugs in Concurrent Programs," Proceedings of the 8th USENIX Conference on Operating Systems Design and Implementation (OSDI '08), San Diego, Dec. 8-10, 2008, pp. 267-280.

Park, S., et al., "CTrigger: Exposing Atomicity Violation Bugs from Their Hiding Places," Proceedings of the 14th International Conference on Architectural Support for Programming Languages and Operating Systems (ASPLOS '09), Washington, D.C., Mar. 7-11, 2009, 12 pages.

Park, S., et al., "Falcon: Fault Localization in Concurrent Programs," Proceedings of the 32nd ACM/IEEE International Conference on Software Engineering (ICSE '10), Cape Town, South Africa, May 2-8, 2010, vol. 1, pp. 245-254.

Shi, Y., et al., "Do I Use the Wrong Definition? DeFuse: Definition—Use Invariants for Detecting Concurrency and Sequential Bugs," Proceedings of the ACM International Conference on Object Oriented Programming Systems Languages and Applications (OOPSLA/SPLASH '10), Reno, Nev., Oct. 17-21, 2010, 15 pages.

Xu, M., et al., "A Serializability Violation Detector for Shared-Memory Server Programs," Proceedings of the ACM SIGPLAN Conference on Programming Language Design and Implementation (PLDI '05), Chicago, Jun. 11-15, 2005, 14 pages.

Yu, J., and S. Narayanasamy, "A Case for an Interleaving Constrained Shared-Memory Multi-Processor," Proceedings of the 36th Annual International Symposium on Computer Architecture (ISCA '09), Austin, Tex., Jun. 20-24, 2009, 11 pages.

* cited by examiner

```
Line  class Queue
      {
              Queue()
              {
(A)                   items = ...;
(B)                   qsize = 0;
              }

Enqueue(item i)
              {
(C)                   items.Add(i);
(D)                   qsize++;
              } item * Dequeue()
              {
(E)                   if (qsize == 0)
(F)                           return null;
(G)                   qsize--;
(H)                   return items[...];
              } int Size()
              {
(I)                   return qsize;
              }
      } class Spider
      {
              public void run()
              {
(J)                   while (true)
                      {
(K)                           if (q.Size() == 0)
                              {
(L)                                   continue;
                              }

(M)                           item = q.Dequeue();

(N)                           x = item.GetD();
                      }
              }
      }
```

*Fig.1A.*

Fig.5.
Fig.6A.
Fig.6B.
Fig.6C.

① READ HIT
② READ MISS WITHOUT SHARERS
③ READ MISS WITH SHARERS
④ WRITE (ANY)
⑤ WRITE MISS
⑥ WRITE HIT
⑦ INCOMING INVALIDATE
⑧ INCOMING READ REQUEST
----- REMOTE OPERATION
—— LOCAL OPERATION

| SOURCE INSTRUCTION | SOURCE CONTEXT | SOURCE TIMESTAMP | SINK INSTRUCTION | SINK CONTEXT | SINK TIMESTAMP |
|---|---|---|---|---|---|
| (N/A) | N/A | N/A | (A) | <EMPTY> | 1 |
| (N/A) | N/A | N/A | (B) | 1 | 2 |
| (D) | 1, 1, 1 | 4 | (I) | 3, 3, 3, 3 | 5 |
| (D) | 1, 1, 1 | 4 | (I) | 2, 3, 3, 3, 3 | 6 |
| (D) | 1, 1, 1 | 4 | (G) | 0, 2, 3, 3, 3 | 7 |
| (G) | 0, 2, 3, 3 | 7 | (E) | 3, 2, 0, 3, 3 | 8 |

SYSTEMS AND METHODS FOR FINDING CONCURRENCY ERRORS

CROSS-REFERENCE TO RELATED APPLICATIONS

This application is a division of U.S. application Ser. No. 13/312,844, filed Dec. 6, 2011, which claims the benefit of U.S. Provisional Application No. 61/420,185, filed Dec. 6, 2010, the entire disclosures of which are incorporated herein by reference in their entirety for all purposes.

STATEMENT OF GOVERNMENT LICENSE RIGHTS

This invention was made with government support under CNS-0720593 and CCF-0930512, awarded by the National Science Foundation. The government has certain rights in the invention.

BACKGROUND

Concurrency errors are difficult problems for developers writing multi-threaded applications to solve. Even expert programmers have difficulty predicting complicated behaviors resulting from the unexpected interaction of operations in different threads. Three exemplary types of concurrency errors are data races, atomicity violations, and ordering violations. Data races occur when two or more memory operations in different threads, at least one of which is a write, access the same memory location and are not properly synchronized. Atomicity violations happen when memory operations assumed to be executed atomically are not enclosed inside a single critical section. Ordering violations happen when memory accesses in different threads happen in an unexpected order. Some particularly difficult concurrency errors to resolve involve multiple variables. Though some efforts have been made to individually detect data races, locking discipline violations, and atomicity violations, what is needed are automated systems and methods for finding general concurrency errors, including multivariable errors and ordering violations.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a nontransitory computer-readable medium having computer-executable instructions stored thereon is provided. If executed by one or more processors of a computing device, the instructions cause the computing device to perform actions to analyze a set of context-aware communication graphs for debugging. The actions comprise creating a set of aggregate reconstructions based on edges of the set of communication graphs, ranking the aggregate reconstructions in order of likelihood of being associated with a failed execution, and presenting one or more highly ranked aggregate reconstructions.

In some embodiments, a computer-implemented method of building a context-aware communication graph is provided. The method comprises detecting an access of a memory location by a first instruction of a first thread; updating a context associated with the first thread; and, in response to determining that a second instruction of a second thread different from the first thread was a last thread to write to the memory location, adding an edge to the context-aware communication graph, the edge including the context associated with the first thread, a sink identifying the first instruction, a source identifying the second instruction, and a context associated with the second thread.

In some embodiments, a computing device for detecting concurrency bugs is provided. The device comprises at least two processing cores, at least two cache memories, a coherence interconnect, and a communication graph data store. Each cache memory is associated with at least one processing core, and is associated with coherence logic. The coherence interconnect is communicatively coupled to each of the cache memories. The coherence logic is configured to add edges to a communication graph stored in the communication graph data store based on coherence messages transmitted on the coherence interconnect.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1A illustrates an exemplary pseudocode listing that may exhibit concurrency errors if executed by multiple concurrent threads;

FIG. 5 is a table that illustrates abbreviations introduced for the ease of discussion;

FIGS. 6A-6C are tables that illustrate an exemplary embodiment of data stored within a memory location metadata data store according to various aspects of the present disclosure;

FIG. 10 is a table that illustrates an exemplary communication graph suitable for storage in a communication graph data store according to various aspects of the present disclosure;

DETAILED DESCRIPTION

FIG. 1A illustrates an exemplary pseudocode listing that may exhibit concurrency errors if executed by multiple concurrent threads. The figure includes a set of instruction numbers 102 and a C++-like pseudocode listing 104. The instruction numbers 102 have been provided as letters for sake of discussion in order to disambiguate from numbers used later to indicate timestamps. Certain details have been elided from the pseudocode, such as the details of Instruction A and Instruction H, and the details of the Add( ) function. It may be assumed that the details of Instruction A and Instruction H do not have any effect on inter-thread communication, and that the Add( ) function includes a single memory write operation to the memory location referred to by the "items" variable. Further, it may be assumed for sake of discussion that each line of pseudocode involves at most a single instruction that affects a memory location, though in some embodiments of actual programming languages, many instructions that affect many memory locations may reside in a single line of code.

Though it may be difficult to find through a mere inspection of the code listing 104, the Spider class includes a concurrency error. Specifically, there is an implicit assumption that Instruction K and Instruction M are included in a single atomic operation. Since there is no protection mechanism in place, multiple threads concurrently executing this code may sometimes experience an attempt to access a null pointer in Instruction N.

Figure 1B:
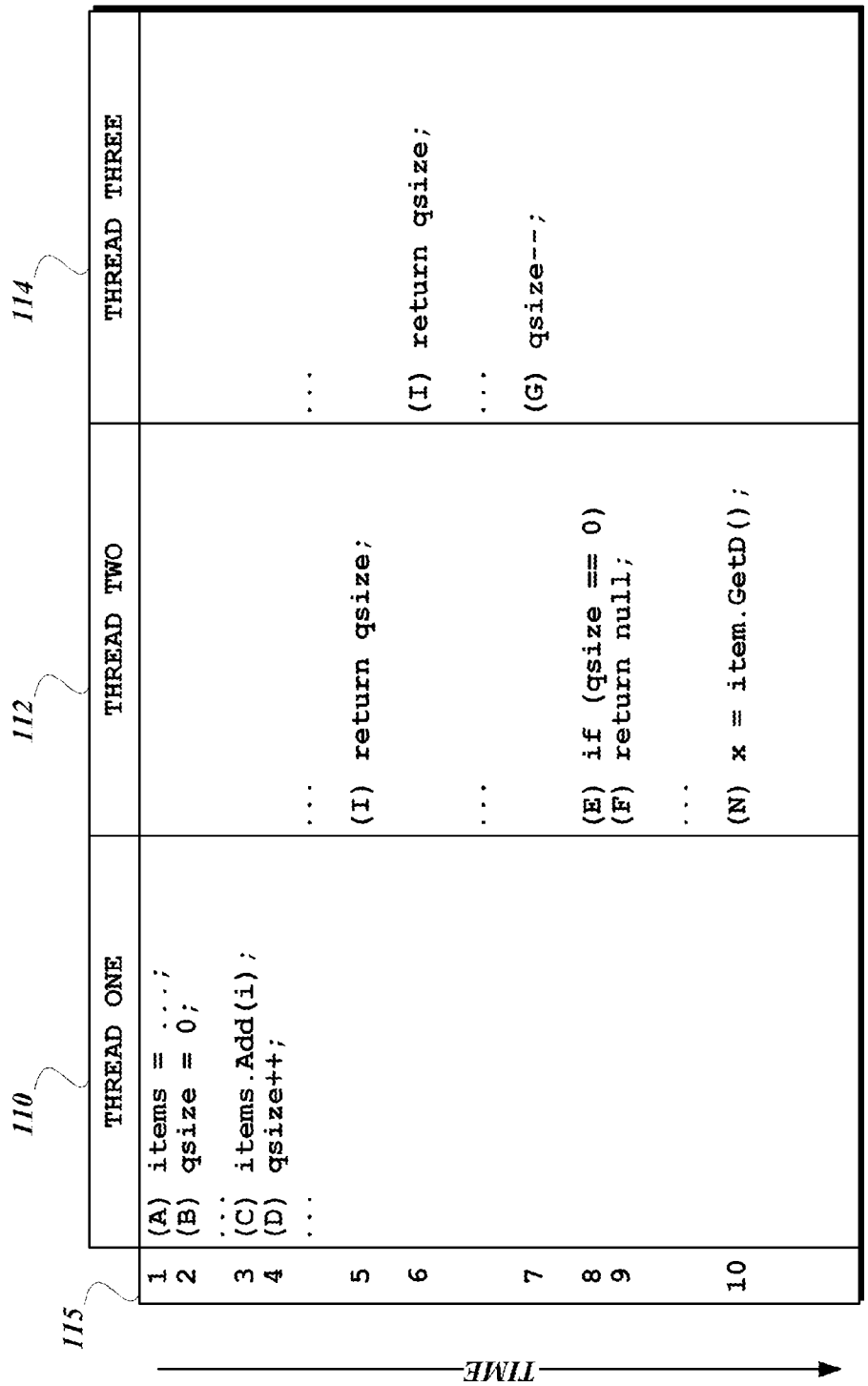
FIG. 1B illustrates memory accesses and other operations during an exemplary multiple-threaded execution of the pseudocode listing of FIG. 1A.

FIG. 1B illustrates memory accesses and other operations during an exemplary multiple-threaded execution of the pseudocode listing of FIG. 1A. Three threads—thread one 110, thread two 112, and thread three 114—are used to execute the pseudocode listing 104. The parenthesized letters correspond to the set of instruction numbers 102 in FIG. 1A, and the sequence of execution proceeds from the top of the illustration to the bottom of the illustration. The list of numbers 115 illustrates an exemplary timestamp for the execution of each instruction. Low integers are used for timestamps for ease of discussion only, and in other embodiments, other types of data may be used for timestamp values. For example, in some embodiments, a return value of an RDTSC x86 instruction, a system time value, and/or the like may be used as the timestamp. As with FIG. 1A, certain details that do not have an effect on the concurrency error or the memory accesses have been elided from the figure for ease of discussion.

Thread one 110 begins by executing Instruction A and Instruction B to initialize the "items" variable and to set the "qsize" variable to "0." Next, thread one 110 executes Instruction C to add the value "i" to the "items" variable, and executes Instruction D to increment the value of the "qsize" variable from "0" to "1." Thread two 112 enters the "while" loop at Instruction J, and executes the check at Instruction K to determine whether the size of the Queue object is "0." At Instruction I, thread two 112 accesses the "qsize" variable, which was last incremented to "1" by thread one 110. Thread two 112 will then proceed to Instruction M, because the value retrieved from the "qsize" variable was not "0."

Next, thread three 114 proceeds to begin to dequeue the single item from the Queue object. At Instruction I, thread three 114 reads the "qsize" variable, and determines that it may proceed to dequeue an object. Assuming the execution of thread three 114 next proceeds to Instruction G, thread three 114 writes to the "qsize" variable, decrementing it to "0."

Next, execution returns to thread two 112. At Instruction M, thread two 112 calls the Dequeue( ) function, which proceeds to Instruction E. At Instruction E, thread two 112 accesses the "qsize" variable, and determines that it is now "0" (as updated by thread three 114). At Instruction F, the Dequeue( ) function returns "null" in response to the value of the "qsize" variable, and so the value of "item" in Instruction M is set to "null." At Instruction N, thread two 112 attempts to call the function GetD( ) on a pointer set to "null," which causes an exception, a system crash, or some other undefined failure depending on the operating environment.

Communication Graphs

A communication graph may be used to represent communication between threads in a multi-threaded environment. In some embodiments, a communication graph includes one or more edges that represent communication events. Each edge includes a source node and a sink (or destination) node. The source node of an edge represents a write instruction. The sink node of an edge represents a read instruction or a write instruction that accessed the memory location written by the write instruction of the source node. In some embodiments, the communication graph may also include a source node for uninitialized states, thus allowing edges to be created when a memory location first accesses otherwise uninitialized memory locations.

Communication graphs may be context-oblivious or context-aware. In a context-oblivious communication graph, concurrency errors may lead to edges that are only present in graphs of buggy executions, and so may be useful for detecting some concurrency errors. However, if a given edge may be present in both failed executions and correct executions, such as in an interleaving error affecting multiple variables, a context-oblivious communication graph may not include enough information to detect the error.

Figure 2:
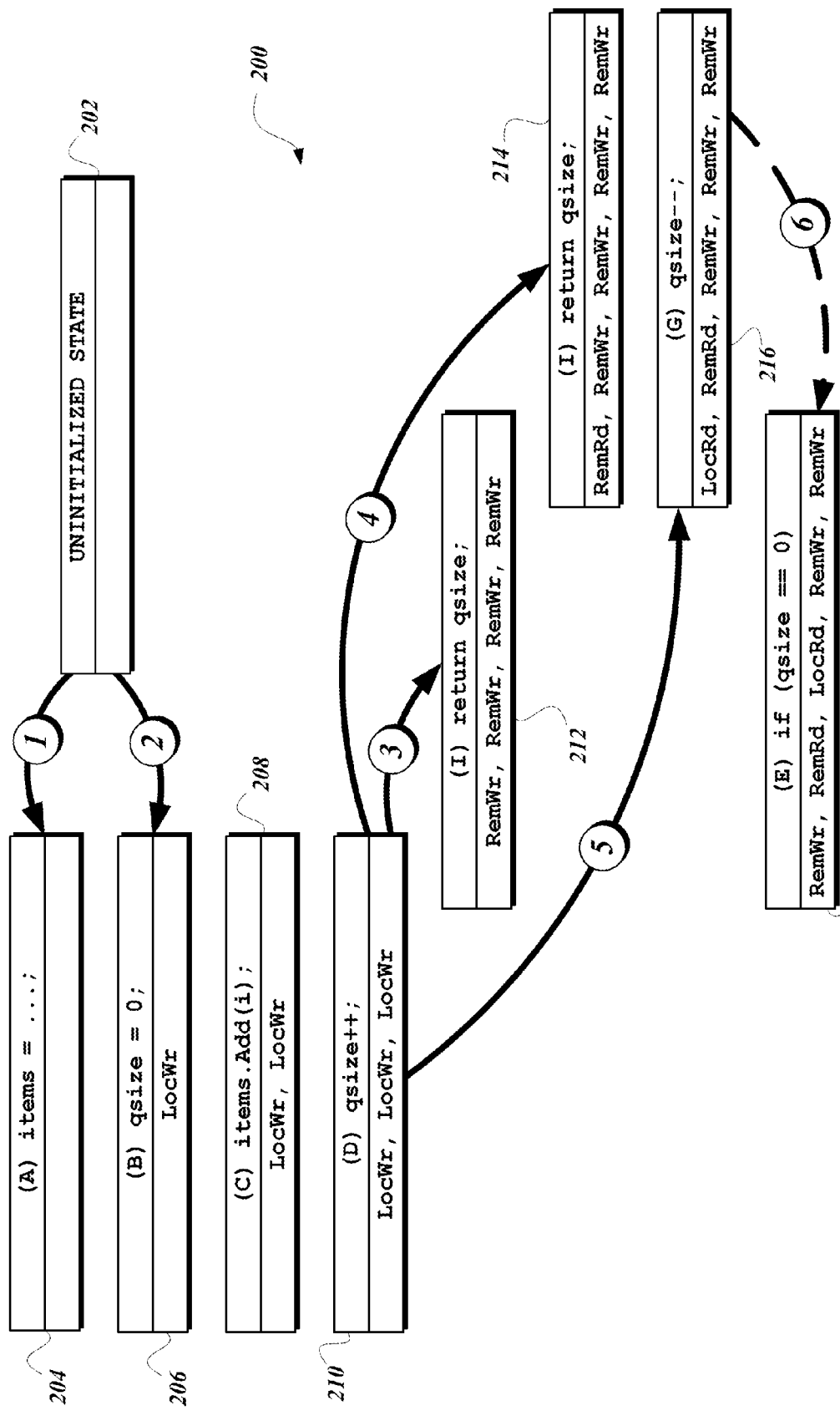
FIG. 2 illustrates an exemplary context-aware communication graph according to various aspects of the present disclosure.

In a context-aware communication graph, each edge may include information representing a relative order of communication events. One example of a context-aware communication graph is illustrated in FIG. 2. The communication graph 200 illustrates communication events that occur during the pseudocode execution illustrated in FIG. 1B, using instruction numbers and code fragments from the code listing in FIG. 1A. The communication graph 200 includes a set of nodes and a set of edges. Each node includes an associated instruction address (illustrated in the top half of each node) and a context (illustrated in the bottom half of each node). Each node is unique, in that no two nodes will represent the same instruction address and context. Each edge is labeled in the figure by an edge number for ease of discussion only, and extends from a source node to a sink node. Each node in the communication graph 200 may be a sink node or a source node for any number of edges. In some embodiments, some nodes stored in the communication graph 200 may not be associated with any edges, such as, for example, when multiple consecutive memory accesses occur within a single thread.

For ease of discussion, the description herein only analyzes the memory locations denoted by the variables "qsize" and "items," so that each line of pseudocode may be considered to include a single instruction that affects a single memory location. Also, the description treats the variable "items" and the Add( ) function that affects it as affecting a single memory location. One of ordinary skill in the art will understand that, in some embodiments, context-aware communication graphs may describe every memory access separately, including multiple memory accesses for a single line of code.

The context stored in each node represents a relative order of communication events, and may be any suitable type of information for storing such information. In some embodiments, context information may include information uniquely identifying every dynamic memory operation. However, since the size of such a graph would continue to grow over time, it may be desirable to store a smaller set of context information that nonetheless represents sufficient detail to allow for the detection of concurrency bugs.

In some embodiments, the context information may include a sequence of communication events observed by a thread immediately prior to the execution of a memory instruction regardless of the memory location involved. The communication events may be stored in a FIFO queue of a predetermined length, such that once the queue is full, an oldest entry is discarded before adding a new entry. In some embodiments, the predetermined length of the FIFO queue may be any length, such as five elements, more than five elements, or less than five elements. In the embodiment illustrated in FIG. 2, the predetermined length of the context FIFO queue is five elements.

In some embodiments, four types of communication events may be observed by a local thread. A local read ("LocRd") is a read of a memory location last written by a remote thread. A local write ("LocWr") is a write to a memory location last written by a remote thread. A remote read ("RemRd") is a read of a memory location by a remote thread that was last written by the local thread. A remote write ("RemWr") is a write to a memory location by a remote thread that was last written by the local thread. The type of event is what is stored in the context FIFO, without the memory location associated with the event.

In FIG. 2, nine nodes corresponding to the execution trace of FIG. 1B are illustrated. An uninitialized state node 202 is included in the graph 200 before execution begins to serve as a source node for edges that represent initial accesses to memory locations. A first node 204 refers to the first memory access in the execution trace, where thread one 110 executes Instruction A to initialize the "items" memory location. The first node 204 stores the instruction location (Instruction A) and a context, which is currently empty because there were no previous memory accesses. An edge ("Edge 1") is created between the uninitialized state node 202 and the first node 204.

A second node 206 refers to the second memory access in the execution trace, where thread one 110 executes Instruction B to initialize the "qsize" memory location. The second node 204 stores the instruction location (Instruction B) and a context, which currently contains a single element, "LocWr," representing the local write to the "items" memory location at Instruction A. An edge ("Edge 2") is created between the uninitialized state node 202 and the second node 204.

Two more nodes, a third node 208 and a fourth node 210, are added when thread one 110 executes Instruction C and Instruction D to update the "items" memory location and the "qsize" memory location, respectively. The context for the third node 208 is "LocWr, LocWr," as the memory writes in Instruction A and Instruction B caused two LocWr states to be pushed onto the context FIFO queue for thread one 110, and the context for the fourth node 210 is "LocWr, LocWr, LocWr," as the memory write in Instruction C caused another LocWr state to be pushed onto the context FIFO queue for thread one 110. No edges are created with the third node 208 or the fourth node 210 as a sink, because the last thread to write to the memory location in each case was the local thread, so there was no thread-to-thread communication.

A fifth node 212 is created when thread two 112 reads the "qsize" memory location at Instruction I. The context for thread two 112 contains "RemWr, RemWr, RemWr, RemWr," representing the four remote write operations performed by thread one 110. An edge ("Edge 3") is created having the fourth node 210 as the source node and the fifth node 212 as the sink node, because the fourth node 210 represents the last write operation to the "qsize" memory location, and because the last thread to write to the "qsize" memory location was not thread two 112, the thread currently accessing the "qsize" memory location.

A sixth node 214 is created when thread three 114 reads the "qsize" memory location at Instruction I. A remote read event was pushed onto the context FIFO for thread three 114 when thread two 112 read the "qsize" memory location, and so the context stored for the sixth node 214 is "RemRd, RemWr, RemWr, RemWr, RemWr." An edge ("Edge 4") is created having the fourth node 210 as the source node and the sixth node 214 as the sink node, because the fourth node 210 represents the last write operation to the "qsize" memory location, and because the last thread to write to the "qsize" memory location was not thread three 114, the thread currently accessing the "qsize" memory location. One should note that, in a context-oblivious communication graph, the interleaving between thread one 110 and thread two 112 and between thread one 110 and thread three 114 would be lost, because both memory reads would be represented by a single edge and would not be distinguishable by context.

A seventh node 216 is created when thread three 114 writes to the "qsize" memory location at Instruction G. A local read event was pushed onto the context FIFO for thread three 114 when it read the "qsize" memory location. The oldest element in the context FIFO, the remote read event added when thread one 110 executed Instruction A, was dropped from the context FIFO because the context FIFO was full before the local read event was pushed onto the context FIFO. Hence, the context stored for the seventh node 216 is "LocRd, RemRd, RemWr, RemWr, RemWr." An edge ("Edge 5") is created having the fourth node 210 as the source node and the seventh node 216 as the sink node, because the fourth node 210 represents the last write operation to the "qsize" memory location, and because the last thread to write to the "qsize" memory location was not thread three 114, the thread currently accessing the "qsize" memory location.

An eighth node 218 is created when thread two 112 reads from the "qsize" memory location at Instruction E. A remote read event was pushed onto the context FIFO for thread two 112 when thread three 114 read the "qsize" memory location, and a remote write event was pushed onto the context FIFO for thread two when thread three 114 wrote to the "qsize" memory location. The two oldest elements were removed from the full context FIFO, and so the context stored in the eighth node 218 is "RemWr, RemRd, LocRd, RemWr, RemWr." An edge ("Edge 6") is created having the seventh node 216 as the source node and the eighth node 218 as the sink node, because the seventh node 216 represents the last write operation to the "qsize" memory location, and because the last thread to write to the "qsize" memory location was not thread two 112, the thread currently accessing the "qsize" memory location. Edge 6 is illustrated as a dashed line, because it is this inter-thread communication that occurs in failed executions. Systems and methods for determining that Edge 6 is identified as being associated with a concurrency error are discussed in further detail below.

Collecting Communication Graphs

Figure 3:
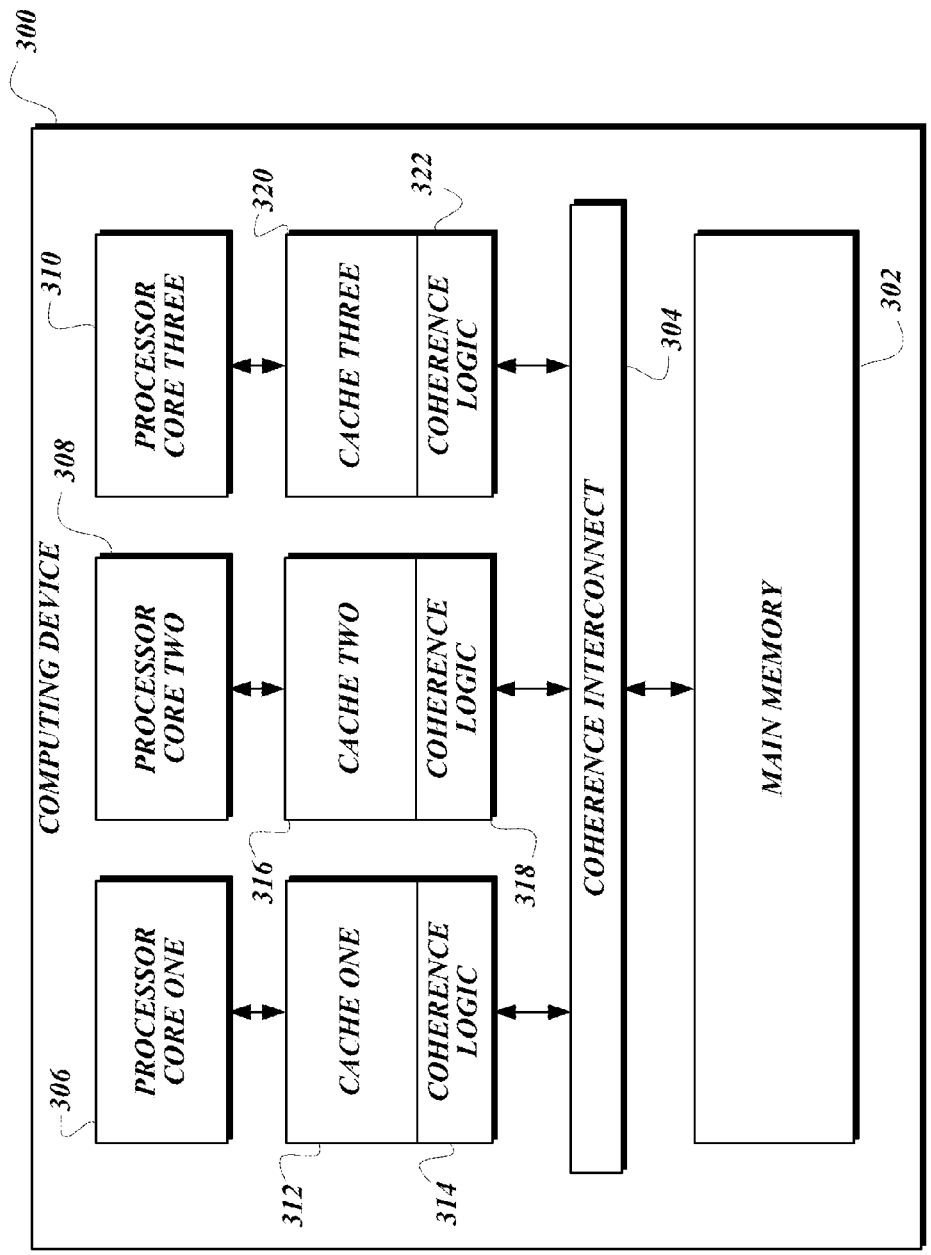
FIG. 3 is a block diagram that illustrates an exemplary computing device suitable for being updated to collect and analyze communication graphs according to various aspects of the present disclosure.

FIG. 3 is a block diagram that illustrates an exemplary computing device suitable for being updated to collect and analyze communication graphs according to various aspects of the present disclosure. The computing device 300 illustrated in FIG. 3 is not configured to collect or analyze communication graphs, but is instead included herein for the sake of further discussion below concerning how to configure a computing device 300 for collecting and/or analyzing communication graphs. The computing device 300 includes main memory 302, a coherence interconnect 304, a set of cache memories 312, 316, 320, and a set of processor cores 306, 308, 310. Each processor core 306, 308, 310 is associated with one of the cache memories 312, 316, 320.

One of ordinary skill in the art will recognize that, in general, to access data from a memory location in main memory 302, a processor core checks if a valid copy of the data from the memory location is present in its associated cache. If so, the processor core uses the cached copy of the data. If not, the coherence interconnect 304 obtains data from the memory location either from another cache which has a valid copy of the data or from main memory 302. In some embodiments, the coherence interconnect 304 may be a coherence bus, a scalable coherence interface, or any other suitable coherence interconnect technology. In some embodiments, the main memory 302 may be any suitable computer-readable medium, such as SRAM, DRAM, flash memory, a magnetic storage medium, and/or the like. In some embodiments, each of the cache memories 312, 316, 320 includes coherence logic 314, 318, 322 that interacts with the coherence interconnect 304 to synchronize the contents of the cache memories.

One of ordinary skill in the art will recognize that each processor core 306, 308, 310 may be located in a separate physical processor, or may be separate processing cores in a single physical processor. Further, one of ordinary skill in the art will also recognize that three processor cores and three cache memories have been illustrated herein for ease of discussion, and that in some embodiments, more or fewer processor cores, and/or more or fewer cache memories, may be used. In addition, in some embodiments, additional levels of cache memory between the illustrated cache and the main memory, or between the illustrated cache and the associated processor core, may be used, multiple processor cores may be associated with a single cache memory, and/or multiple cache memories may be associated with a single processor core. In some embodiments, the computing device 300 may be a desktop computer, a laptop computer, a tablet computing device, a mobile computing device, a server computer, and/or any other suitable computing device having at least one processor that executes more than one thread.

Figure 4:
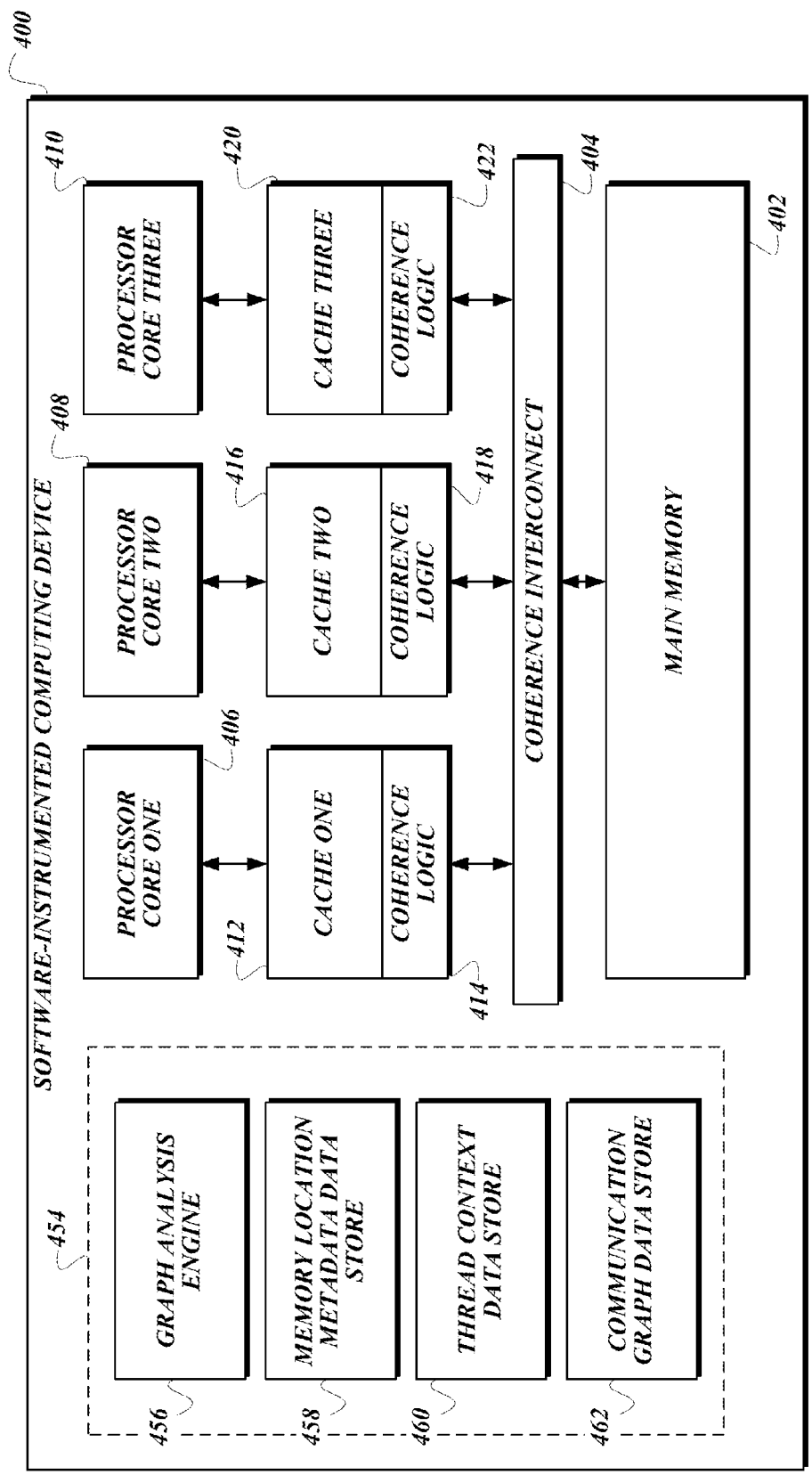
FIG. 4 is a block diagram that illustrates one embodiment of a software-instrumented computing device according to various aspects of the present disclosure.

Two ways of collecting context-aware communication graphs include adding software-based instrumentation that monitors memory accesses within the executable program to be studied, and adding hardware-based features that monitor memory accesses within an uninstrumented executable program. FIG. 4 is a block diagram that illustrates one embodiment of a software-instrumented computing device 400 according to various aspects of the present disclosure. The software-instrumented computing device 400 is similar to the computing device 300 illustrated in FIG. 3, and includes three processor cores 406, 408, 410, three caches 412, 416, 420 that each include coherence logic 414, 418, 422, a coherence interconnect 404, and a main memory 402. However, the software-instrumented computing device 400 has been configured with one or more components 454 for collecting context-aware communication graphs.

In some embodiments, the components 454 include a graph analysis engine 456, a memory location metadata data store 458, a thread context data store 460, and a communication graph data store 462. The thread context data store 460 is configured to store a context FIFO queue for each thread executed by the computing device 400. The memory location metadata data store 458 is configured to store metadata for each memory location identifying at least an instruction and thread that last wrote to the memory location. The communication graph data store 462 is configured to store one or more communication graphs built using the information stored in the thread context data store 460 and the memory location metadata data store 458. The communication graph data store 462 may also store an indication of whether each communication graph is associated with correct behavior or failed behavior. The graph analysis engine 456 is configured to analyze a stored communication graph to find edges to be inspected for errors, as discussed further below.

In some embodiments, to analyze an executable program using the computing device 300, the executable program is instrumented to monitor memory accesses. For example, in some embodiments, a binary may be instrumented using the Pin dynamic instrumentation tool by Intel Corporation. As another example, in some embodiments, Java code may be instrumented using the RoadRunner dynamic analysis framework developed by Cormac Flanagan and Stephen N. Freund. The instrumentation tracks thread contexts, and memory location metadata while the program is executing, and builds the communication graph for storage in the communication graph data store 462. After collection, the graph analysis engine 456 may be used to analyze the communication graphs.

As understood by one of ordinary skill in the art, a "data store" may include any suitable device configured to store data for access by a computing device. Each data store may include a relational database, a structured flat file, and/or any other suitable data storage format.

For example, in some embodiments, the memory location metadata data store 458 may include a fixed-size hash table. To find metadata associated with a particular memory location, the memory location address modulo the hash table size may be used as an index into the hash table. In such an embodiment, a lossy collision resolution policy in which an access may read or overwrite a colliding location's metadata may be tolerated without unduly sacrificing performance if the fixed size of the hash table is large enough, such as having at least 32 million entries. As another example, in some embodiments that use a language such as Java and/or the like, the memory location metadata data store 458 may use a shadow memory feature of an instrumentation utility such as RoadRunner and/or the like to implement a distributed metadata table. Unique identifiers of memory access instructions in the bytecode may be used instead of instruction addresses. Contexts may be stored as integers using bit fields.

As yet another example, in some embodiments, a communication graph data store 462 may include a chaining hash table. To access the chaining hash table, a hash function may separately sum the entries in the source node context and the sink node context. Each node's sum may then be XORed with the instruction address of the node. The hash key may then be generated by XORing the result of the computation for the source node with the result of the computation for the sink node. As still another example, in some embodiments, a communication graph data store 462 may include an adjacency list and may use hash sets. In such an embodiment, nodes may be indexed by instruction address/context pairs. In some embodiments, other methods or data structures may be used within the communication graph data store 462, the memory location metadata data store 458, or any other data store described herein.

Each data store may include one or more non-volatile computer-readable storage media, such as a magnetic drive, optical drive, flash drive, and/or the like, and/or may include one or more volatile computer-readable storage media, such as DRAM, SRAM, and/or the like. Each data store may be accessible locally by the computing device, or may be accessible over some type of network. One of ordinary skill in the art will recognize that separate data stores described herein may be combined into a single data store, and/or a single data store described herein may be separated into multiple data stores, without departing from the scope of the present disclosure. For example, in some embodiments, partial communication graphs may be stored in separate communication graph data stores 462 that are local to each thread. In such an embodiment, performance may be improved by making addition of edges to the graph a thread-local operation. When such a thread ends, the partial communication graph may be merged into a global communication graph stored in a master communication graph data store 462.

As understood by one of ordinary skill in the art, the term "engine" as used herein refers to logic embodied in hardware or software instructions, which may be written in a programming language, such as C, C++, COBOL, JAVA™, PHP, Perl, C#, and/or the like. An engine may be compiled into executable programs or written in interpreted programming languages. Software engines may be callable from other engines, or from themselves. Generally, the engines described herein refer to logical modules that may be merged with other engines or applications, or may be divided into sub-engines. The engines may be stored on any type of computer-readable medium or computer storage device and be stored on and executed by one or more general purpose computing devices, thus creating a special purpose computing device configured to provide the engine.

FIG. 5 is a table that illustrates abbreviations introduced for the ease of discussion. Four context values tracked by some embodiments of the present disclosure are Local Read ("LocRd"), Local Write ("LocWr"), Remote Read ("RemRd"), and Remote Write ("RemWr"). In the embodiments illustrated herein, these values may be represented by the integers 0, 1, 2, and 3, respectively, as indicated in the table in FIG. 5. Accordingly, a context having a fixed length of five elements may be represented by an array of anywhere from zero to five integers. This notation is used below interchangeably with the abbreviated notation for brevity and clarity. One of ordinary skill in the art will understand that the integer values map to the context values listed in FIG. 5. One of ordinary skill in the art will also understand that, in some embodiments, any other suitable representation may be used for individual context values and/or the elements of a context FIFO queue. For example, in some embodiments, a single integer may be used to represent all possible combinations of elements in a context FIFO queue. In an embodiment having four context values and a queue length of five, the integers between 0 and 1023, inclusive, may be used to represent every possible context FIFO queue.

FIGS. 6A-6C are tables that illustrate an exemplary embodiment of data stored within a memory location metadata data store 458 according to various aspects of the present disclosure. The information stored within a memory location metadata data store 458 represents a previous instruction that wrote to each memory location. In the illustrated embodiment, the tables store values for a memory location, a last writer thread ID, a last writer instruction, a context, and a timestamp. In some embodiments, more or less information than that shown in the figures may be stored in the memory location metadata data store 458. For example, in some embodiments, the timestamp value may not be collected, or more or less context information may be collected.

FIGS. 6A-6C contain exemplary information that may be collected during the execution trace illustrated in FIG. 1B. FIG. 6A illustrates a table 602 in the memory location metadata data store 458 after thread one 110 has executed Instruction B at time 2. The table 602 includes two entries for the two memory locations that were accessed: the "items" location and the "qsize" location. Both locations were last written by thread one 110. The "items" location was last written by Instruction A at timestamp 1, and the "qsize" location was last written by Instruction B at timestamp 2. As discussed above, the context for the write to the "items" memory location was empty, and the context for the write to the "qsize" memory location was "1" ("LocWr," using the shorthand illustrated in FIG. 5).

FIG. 6B illustrates the table 602 after thread one 110 has executed Instruction D at time 4. The entry for the "items" location has been updated to show that the last writer instruction was Instruction C, and that the write occurred at timestamp 3 with a context of "1, 1" (corresponding to "LocWr, LocWr"). The entry for the "qsize" location has been updated to show that the last writer instruction was Instruction D, and that the write occurred at timestamp 4 with a context of "1, 1, 1" (corresponding to "LocWr, LocWr, LocWr"). Since both writes occurred in thread one 110, the last writer thread ID values for both entries remained the same.

FIG. 6C illustrates the table 602 after thread three 114 has executed Instruction G at time 7. The entry for the "qsize" location has been updated to show that the last writer thread was thread three 114 instead of thread one 110, that the last writer instruction was Instruction G, and that the write occurred at timestamp 7 with a context of "0, 2, 3, 3, 3" (corresponding to "LocRd, RemRd, RemWr, RemWr, RemWr").

Upon detecting a memory access, the information in the memory location metadata data store 458 may be consulted to determine whether an edge should be added to a communication graph, and then may be updated if the memory access is a write. For example, upon detecting the read of the "qsize" location by Instruction I at time 5 in thread two 112, the entry for the "qsize" location is checked, and it is determined that the last writer thread was not thread two 112 (see FIG. 6B). Accordingly, an edge (Edge 3) is added to the communication graph having a source node indicating at least Instruction D and context "1, 1, 1," and a sink node indicating at least Instruction I and context "3, 3, 3, 3." In some embodiments, the timestamp information for both the source node and the sink node may also be included in the edge. One of ordinary skill in the art will understand that the rest of the communication graph may be similarly constructed during the execution of the code listing.

Figure 7:
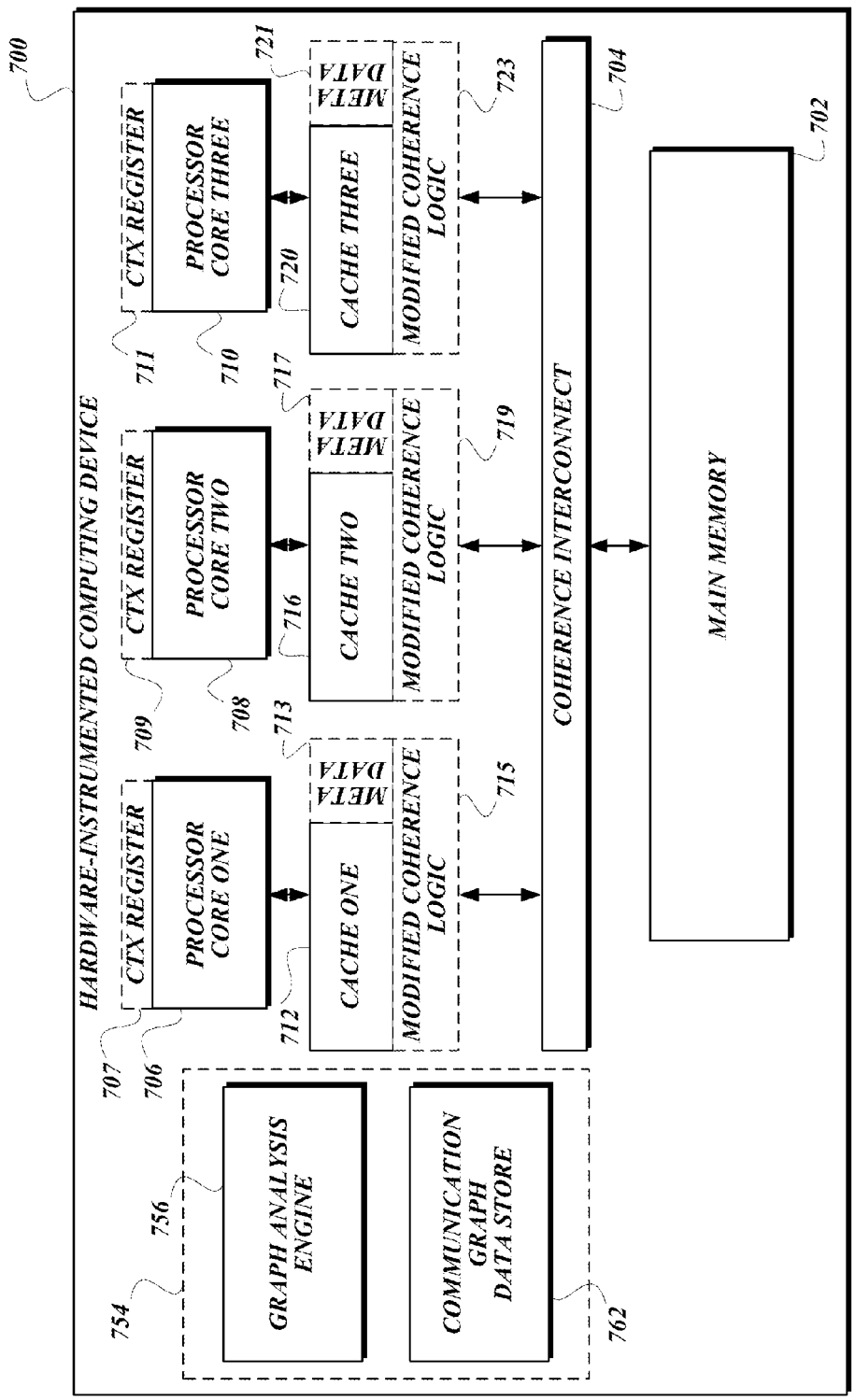
FIG. 7 is a block diagram that illustrates one embodiment of a hardware-instrumented computing device according to various aspects of the present disclosure.

FIG. 7 illustrates one embodiment of a hardware-instrumented computing device 700 according to various aspects of the present disclosure. As with the other computing devices illustrated and discussed above with respect to FIGS. 3 and 4, the hardware-instrumented computing device 700 includes a main memory 702, a coherence interconnect 704, three processor cores 706, 708, 710, and three cache memories 712, 716, 720. Each of these components includes similar structure and function to the like components discussed above, except as outlined below. The hardware-instrumented computing device 700 also includes components 754 for storing and analyzing context-aware communication graphs. The components 754 include a graph analysis engine 756 and a communication graph data store 762 that may be similar to the graph analysis engine 456 and communication graph data store 462 discussed above. One difference between the communication graph data store 462 and the communication graph data store 762 is that the communication graph data store 762 may be populated by the additional hardware components discussed below instead of by instrumented software code.

Each processor core 706, 708, 710 is augmented with a context register 707, 709, 711. The context register 707, 709, 711 is configured to store a context FIFO queue, as described above, for a thread currently being executed by the associated processor core 706, 708, 710. Further, each cache line in each cache memory 712, 716, 720 is augmented with metadata 713, 717, 721 that describes the last instruction to write to the cache line. Details of the cache lines, including the metadata 713, 717, 721, are discussed further below with respect to FIGS. 9A-9D.

Whereas the cache memories illustrated in FIGS. 3 and 4 included unaltered coherence logic, the cache memories 712, 716, 720 in the hardware-instrumented computing device 700 include modified coherence logic 715, 719, 723. The modified coherence logic 715, 719, 723 monitors coherence messages sent via the coherence interconnect 704, and updates the metadata 713, 717, 721, and the context registers 707, 709, 711 accordingly. In some embodiments, only thread-to-thread communication that results in cache-to-cache transfers or memory-to-cache transfers may be considered for addition to communication graphs. While some thread-to-thread communication that happens between multiple threads on the same processor core may not be monitored in these embodiments, the distribution of threads among processing cores usually provides effective results. The modified coherence logic 715, 719, 723 also adds edges to communication graphs stored in a communication graph data store 762 based on at least the context registers 707, 709, 711 and the metadata 713, 717, 721.

Figure 8:
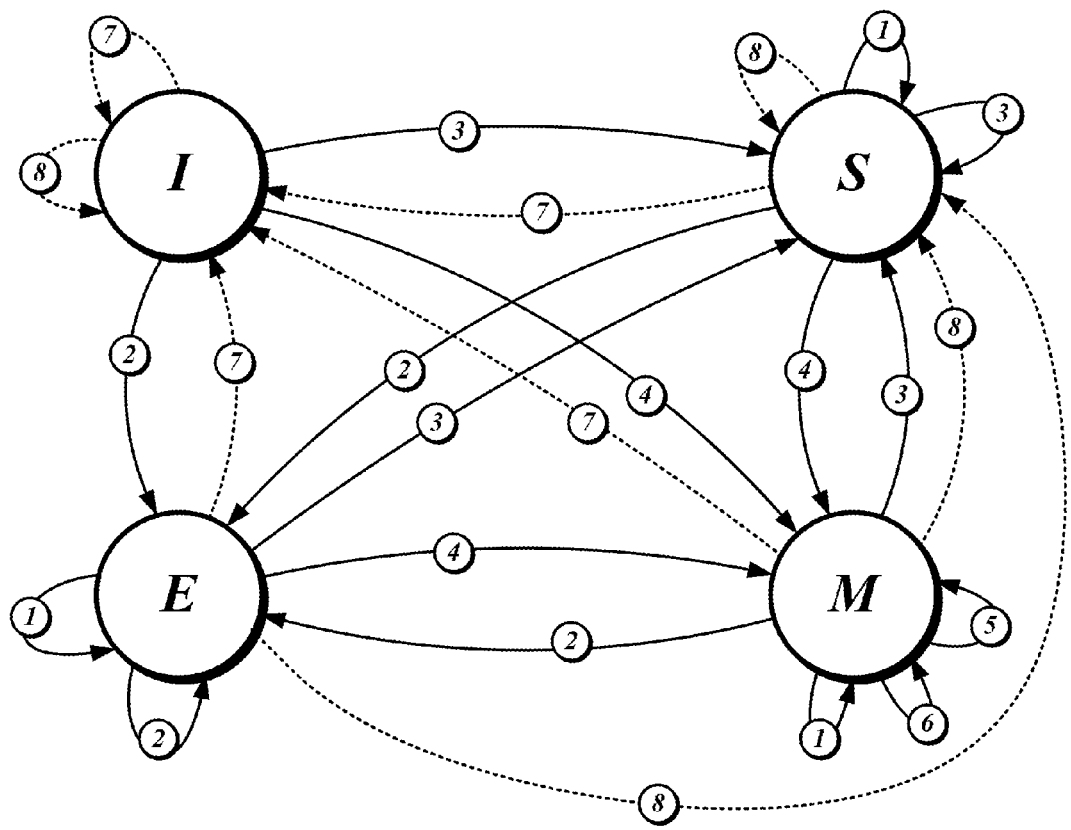
FIG. 8 is a state diagram that illustrates state changes in an MESI coherence protocol suitable for use with embodiments of the present disclosure.

In some embodiments, the modified coherence logic 715, 719, 723 is based on a modified MESI coherence protocol. Standard MESI coherence protocols are generally known in the art, and so are not discussed herein at length. However, FIG. 8 is a state diagram that illustrates state changes in an MESI coherence protocol suitable for use with embodiments of the present disclosure. As known to one of ordinary skill in the art, the states of the MESI coherence protocol describe the status of a cache line, and may be Modified, Exclusive, Shared, or Invalid. The numbers on each edge of the state diagram are associated with the legend at the bottom, which describes the type of operation that causes the change from one state to another. Solid lines represent edges that result from an action taken by a local processor associated with the cache, and dashed lines represent edges that result from a message received via the coherence interconnect 704 indicating an action taken by a remote processor.

The modified coherence logic 715, 719, 723 may adhere to a normal MESI coherence protocol, but may augment some coherence messages to share information about the instructions involved with the communication. For example, when a read reply is transmitted, the modified coherence logic 715, 719, 723 may include the metadata 713, 717, 721 of the corresponding cache line to provide information for read-after-write (RAW) communication. As another example, when an invalidate reply or acknowledgement is transmitted, the modified coherence logic 715, 719, 723 may include the metadata 713, 717, 721 of the cache line that was invalidated to provide information for write-after-write (WAW) communication.

The modified coherence logic 715, 719, 723 monitors traffic on the coherence interconnect 704, and pushes context events into the context register 707, 709, 711 of the associated processor core 706, 708, 710 when appropriate. For example, the modified coherence logic 715, 719, 723 may push a local read event into the context register 707, 709, 711 upon detecting a local read miss, a local write event upon detecting a local write miss or upgrade miss, a remote write event upon detecting an incoming invalidate request, and a remote read event upon detecting an incoming read request.

When appropriate, the modified coherence logic 715, 719, 723 also updates the communication graph. For example, the modified coherence logic 715, 719, 723 may add an edge to the communication graph upon detecting a read reply, an invalidate reply, or a read miss serviced from memory 702. Upon detecting a read reply, an edge is added having a source node including information from the metadata included in the read reply, and a sink node including information relating to the local instruction that caused the miss and the context in which the miss happened. Upon detecting an invalidate reply, an edge is added having a source node including information from the metadata for the cache line that was invalidated, and a sink node including information relating to the local instruction that caused the invalidate request and the context in which the request originated. Upon detecting a read miss serviced from memory 702, an edge is added with a source node set to a null value and a sink node including information relating to the local instruction that caused the miss and the context in which the miss happened, to indicate that an otherwise uninitialized memory location was accessed.

Figure 9A:
FIGS. 9A-9D illustrate various embodiments of metadata stored in association with cache lines according to various aspects of the present disclosure.
Figure 9B:
Figure 9C:
Figure 9D:

FIGS. 9A-9D illustrate various embodiments of metadata 713, 717, 721 stored in association with cache lines according to various aspects of the present disclosure. FIG. 9A illustrates a standard cache line that does not have any metadata 713, 717, 721 added. Fields are included for a tag indicating a state in the MESI diagram and for the data itself FIG. 9B illustrates a modified cache line, in which a metadata field has been added to associate a last writer instruction address with the cache line. FIG. 9C adds a writer context field to the modified cache line of FIG. 9B, and FIG. 9D adds a timestamp field to the modified cache line of FIG. 9C. In some embodiments, the writer context field and/or the timestamp may be optional, though the available graph analysis functionality may change. One of ordinary skill in the art will recognize that the information stored in the metadata 713, 717, 721, in aggregate, may be similar to the information stored in the memory location metadata data store 458 in the software-instrumented computing device 400 described above, and may be used for similar purposes. One of ordinary skill in the art will also recognize that the metadata 713, 717,

721 or another portion of the associated cache line may include additional information not illustrated here, such as a writer thread ID or any other information, without departing from the scope of the disclosed subject matter.

Reconstructions

Context-aware communication graphs may be analyzed to determine instructions that are likely associated with failed program behavior. However, since concurrency bugs are difficult to diagnose, it would be helpful if a representation of the behavior of all threads around the instruction could be presented for debugging, and not just the single instruction or the single thread that failed. By adding timestamp data to the nodes of a context-aware communication graph, behavior likely to occur before, during, and after an instruction may be presented for debugging purposes. A reconstruction, according to various aspects of the present disclosure, presents communication nodes that occur before, during, and after an identified edge from a communication graph.

FIG. 10 is a table that illustrates an exemplary communication graph suitable for storage in the communication graph data store 762. Each edge in the communication graph includes a source instruction, a source context, a source timestamp; and a sink instruction, sink context, and sink timestamp. One of ordinary skill in the art will recognize that the communication graph illustrated in tabular format in FIG. 10 is similar to the communication graph illustrated and described in FIG. 2, but has added timestamp information for the source node and the sink node for each edge, when available.

Figure 11:
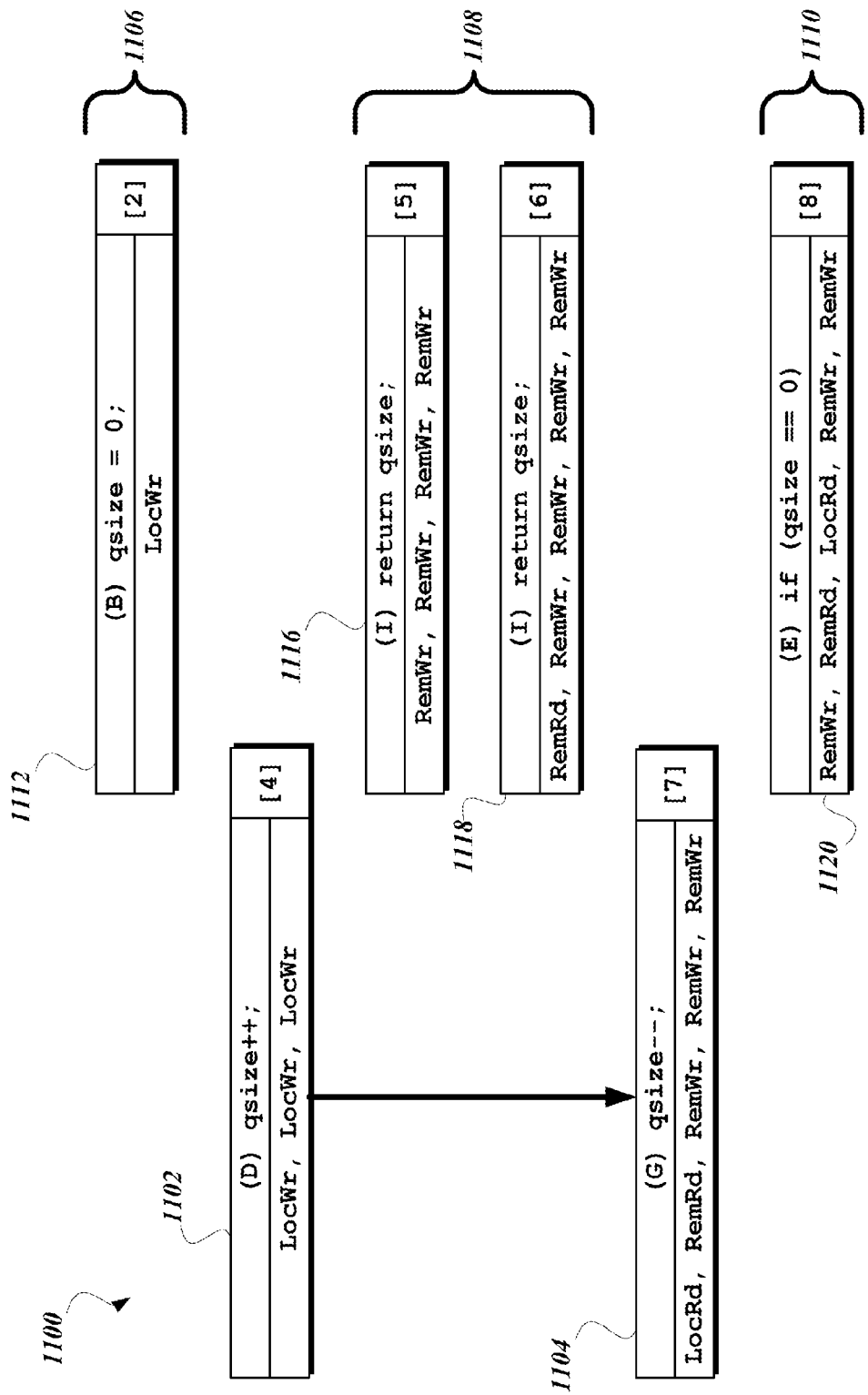
FIG. 11 illustrates an exemplary reconstruction constructed from the communication graph of FIG. 10.

FIG. 11 illustrates an exemplary reconstruction 1100 constructed from the communication graph of FIG. 10. The reconstruction 1100 is based on the edge from source node 1102 to sink node 1104. A prefix section 1106, a body 1108, and a suffix section 1110 are provided to present communication nodes that occurred before, during, and after the communication represented by the edge. In some embodiments, the timestamps of nodes in the communication graph are inspected to determine nodes that are appropriate for the prefix section 1106, body 1108, and suffix section 1110 of the reconstruction 1100. The prefix section 1106 and suffix section 1110 may include any number of nodes. In some embodiments, the prefix section 1106 and/or suffix section 1110 include at most a predetermined number of nodes. In some embodiments, the predetermined number of nodes may be less than or equal to a maximum length of the context FIFO queues used in the communication graph.

Figure 12:
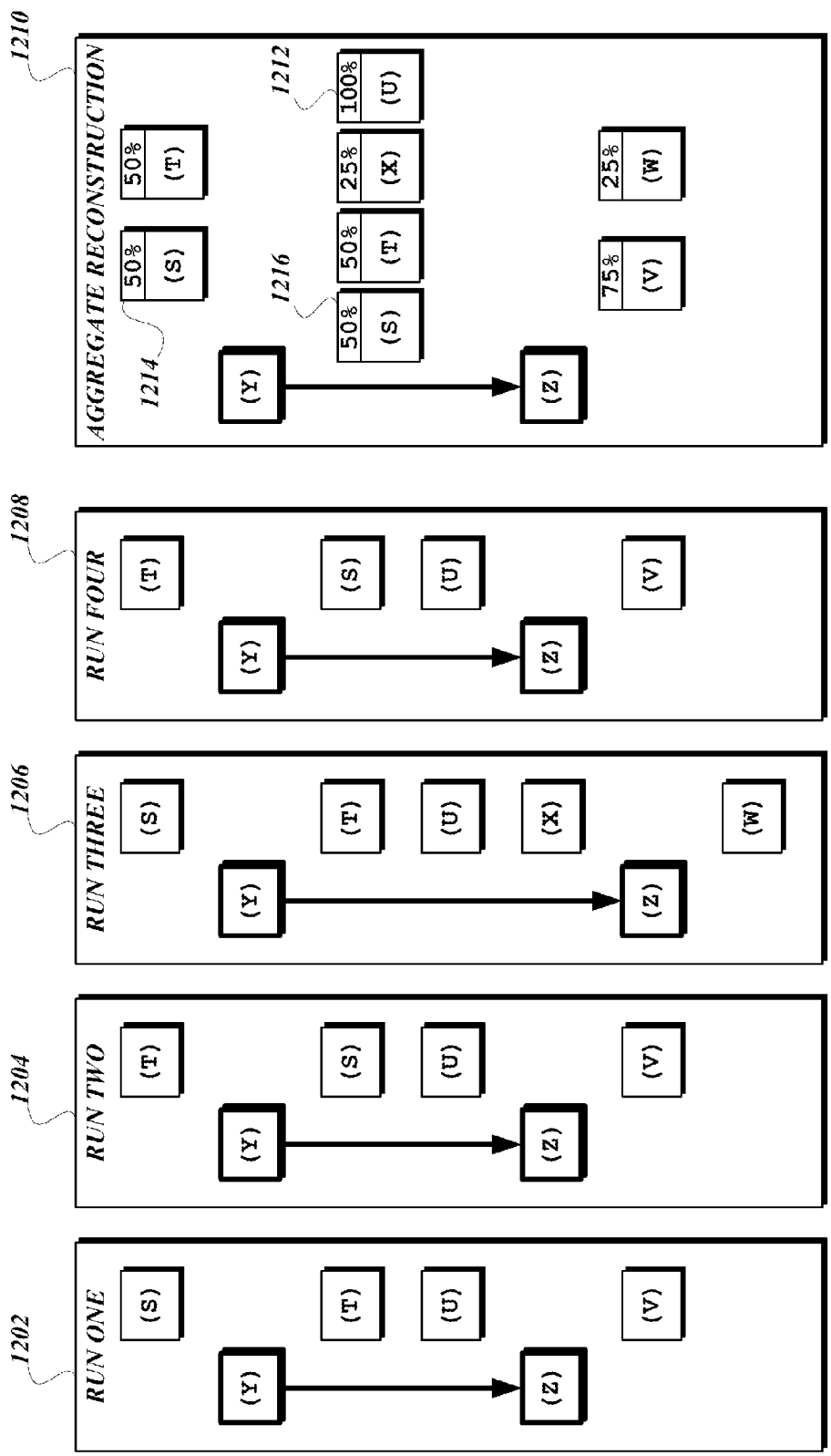
FIG. 12 illustrates the creation of an aggregate reconstruction according to various aspects of the present disclosure.

Though a reconstruction based on a single execution may be useful for understanding what occurred around a given edge, combining results from multiple executions may give a more complete picture of the behavior that is causing problems. However, since the problems represented are multi-threaded and indeterminate in nature, it is likely that even if an edge is repeated in multiple executions the associated reconstructions will not be the same. FIG. 12 illustrates the creation of an aggregate reconstruction 1210, which combines each node that appears in the prefix, body, or suffix of more than one execution into a single structure. FIG. 12 is based on a hypothetical different code listing and communication graph than those discussed in the rest of the present disclosure, having nodes labeled from the letter S to the letter Z. The code listing is not illustrated, but the details of the code listing are not necessary to understand the formation of an aggregate reconstruction.

The code was executed a plurality of times, and communication graphs were created for each execution. In those executions, four executions were identified that had a particular edge having node Y as the source node and node Z as the sink node. For each execution, a reconstruction 1202, 1204, 1206, 1208 was calculated based on the timestamps of the nodes in the communication graph around node Y and node Z. The reconstructions 1202, 1204, 1206, 1208 are slightly different in each case, reflecting the indeterminate nature of the execution.

To form the aggregate reconstruction 1210, the prefixes, bodies, and suffixes of each reconstruction 1202, 1204, 1206, 1208 are unioned together to form an aggregate prefix, an aggregate body, and an aggregate suffix. Nodes may appear in more than one portion of the aggregate reconstruction, because in some executions, a given node may occur before the sink node or source node, and in other executions, the given node may occur after the sink node or source node. Each node in the aggregate reconstruction 1210 is then assigned a confidence value, which indicates a proportion of executions for which the given node appeared in the given portion of the reconstruction. For example, node U in the body of the aggregate reconstruction 1210 is assigned a confidence value 1212 of 100%, because node U was present in the body of every reconstruction. Meanwhile, node S is assigned a confidence value 1214 of 50% in the prefix, and a confidence value 1216 of 50% in the body, because node S appeared in each portion of the reconstructions twice for the four executions. One of ordinary skill in the art will recognize that the other confidence values were similarly derived. In some embodiments, the nodes in the aggregate reconstruction 1210 are not ordered other than being segregated into prefix, body, and suffix portions, as the timestamps may not be comparable from one execution to another. The use of aggregate reconstructions and confidence values to find likely reconstructions that show failures will be discussed further below.

Using Context-Aware Communication Graphs for Debugging

Figure 13:
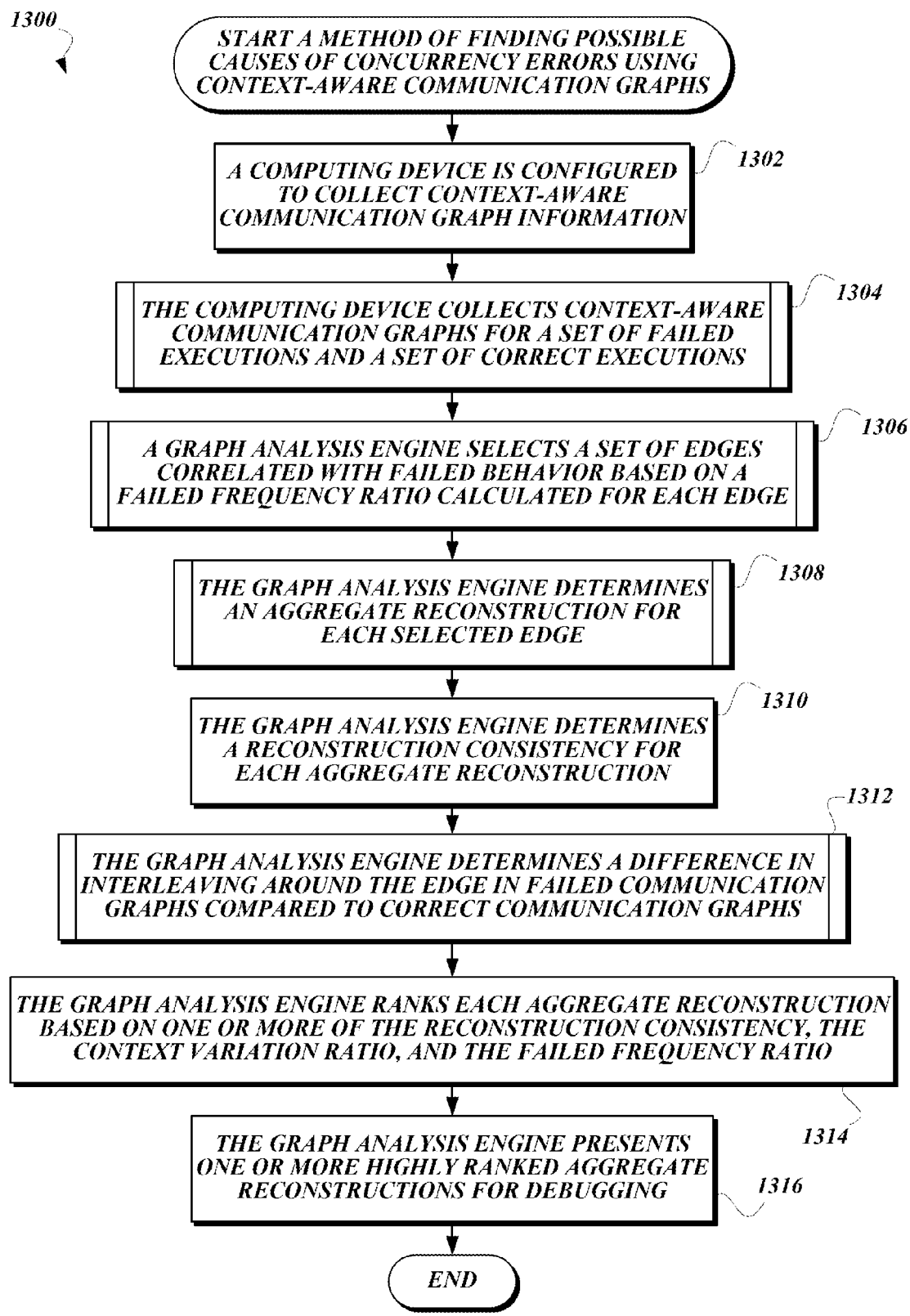
FIG. 13 illustrates one embodiment of a method of finding possible causes of concurrency errors using context-aware communication graphs according to various aspects of the present disclosure.

Once collected, the context-aware communication graphs and reconstructions described above may be used to find concurrency errors. FIG. 13 illustrates one embodiment of a method 1300 of finding possible causes of concurrency errors using context-aware communication graphs. The illustrated method 1300 includes several procedures that are illustrated and described in further detail below.

From a start block, the method 1300 proceeds to block 1302, where a computing device is configured to collect context-aware communication graph information. The computing device may be a software-instrumented computing device 300, a hardware-instrumented computing device 700, or any other suitable computing device configured for collecting context-aware communication graph information, and may be configured as described above. Next, at block 1304, a procedure is performed wherein the computing device collects context-aware communication graphs for a set of failed executions and a set of correct executions.

Figure 14:
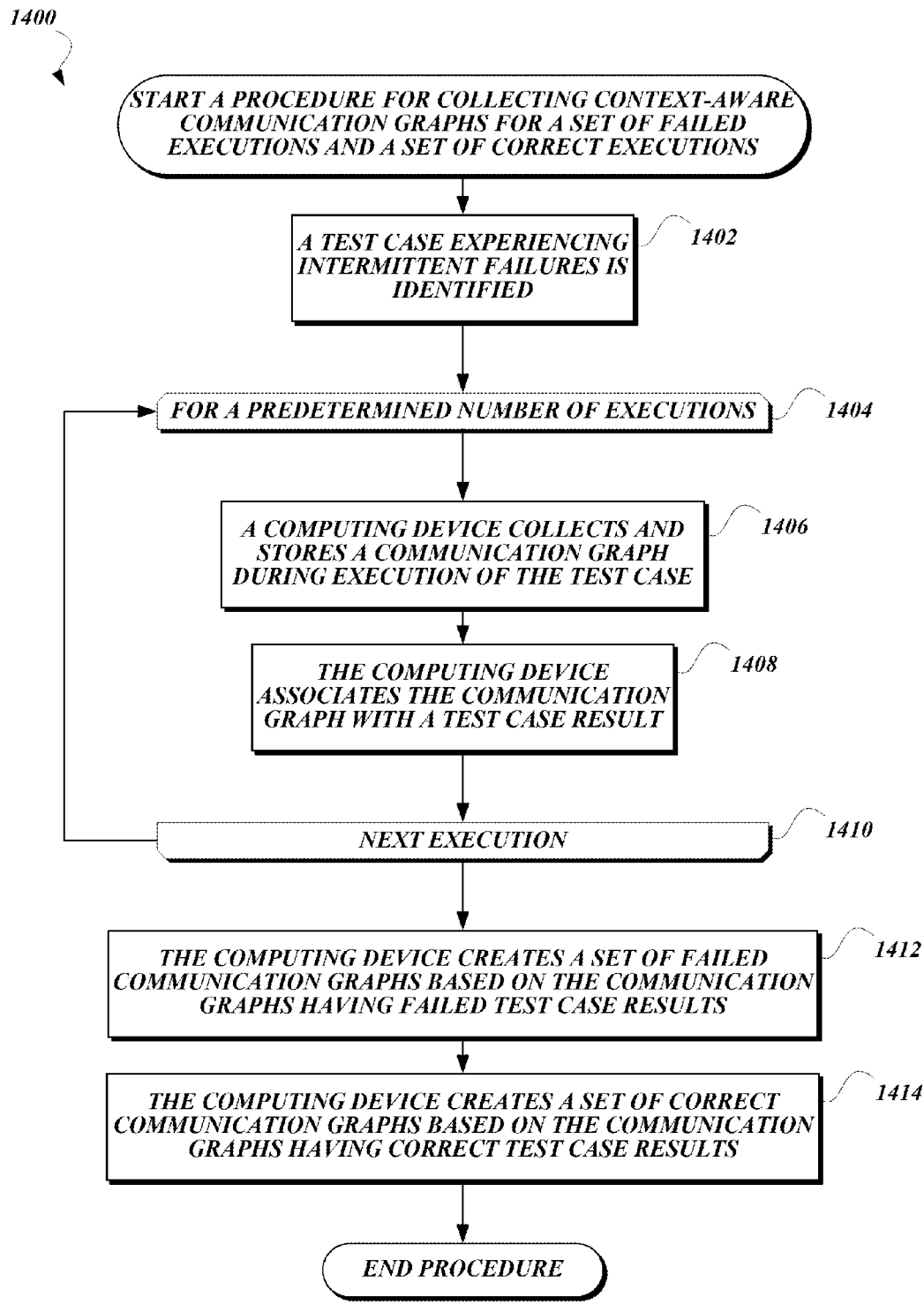
FIG. 14 illustrates one embodiment of a procedure for collecting context-aware communication graphs for a set of failed executions and a set of correct executions according to various aspects of the present disclosure.

FIG. 14 illustrates one embodiment of a procedure 1400 executed at block 1304 of FIG. 13 for collecting context-aware communication graphs for a set of failed executions and a set of correct executions according to various aspects of the present disclosure. From a start block, the procedure 1400 proceeds to block 1402, where a test case experiencing intermittent failures is identified. For example, a software developer may receive reports from users or other testers indicating a particular crash, exception, or other error occurs intermittently during a particular usage scenario. The software developer may then determine one or more reproduction steps to create a test case usable to attempt to recreate the reported error. In other cases, the software developer may execute generic functionality test cases, such as unit tests, load tests, or performance tests, in an attempt to reproduce the error. In some embodiments, the test case or generic functionality test cases may be executed by an automated testing framework, or may be executed by a test user performing a set of reproduction steps.

The procedure 1400 then proceeds to a for loop between a start block 1404 and an end block 1410, wherein the test case is executed and a test case result is determined. In some embodiments, the for loop between blocks 1404 and 1410 is executed a predetermined number of times. In other embodiments, the for loop between blocks 1404 and 1410 may be executed until a predetermined number of failed test case results are collected, and/or any other suitable number of times. From the for loop start block 1404, the procedure 1400 proceeds to block 1406, where the computing device collects and stores a communication graph during execution of the test case. The computing device may collect and store the communication graph via a suitable technique as described above. At block 1408, the computing device associates the communication graph with a test case result. For example, an automated testing framework may store a failed test case result with the communication graph upon detecting that an error occurred or an expected result was not obtained, and may store a correct test case result with the communication graph upon detecting that an expected result was obtained without any errors. As another example, a test user may analyze the results of the test case, and may indicate whether a correct test case result or a failed test case result should be stored with the communication graph.

The procedure 1400 proceeds to the for loop end block 1410 and determines whether the for loop should be executed again. If so, the procedure 1400 returns to the for loop start block 1404. If not, the procedure 1400 proceeds to block 1412, where the computing device creates a set of failed communication graphs based on the communication graphs having failed test case results. At block 1414, the computing device creates a set of correct communication graphs based on the communication graphs having correct test case results. In some embodiments, the computing device may store the set of failed communication graphs and the set of correct communication graphs in the communication graph data store 762 or 462, while in other embodiments, the computing device may store the set of failed communication graphs and the set of correct communication graphs in a separate data store for future processing. The procedure 1400 then proceeds to an end block and terminates.

Returning now to FIG. 13, the method 1300 proceeds from block 1304 to block 1306, where a procedure is performed wherein a graph analysis engine, such as graph analysis engine 456 or 756, selects a set of edges correlated with failed behavior based on a failed frequency ratio calculated for each edge.

Figure 15:
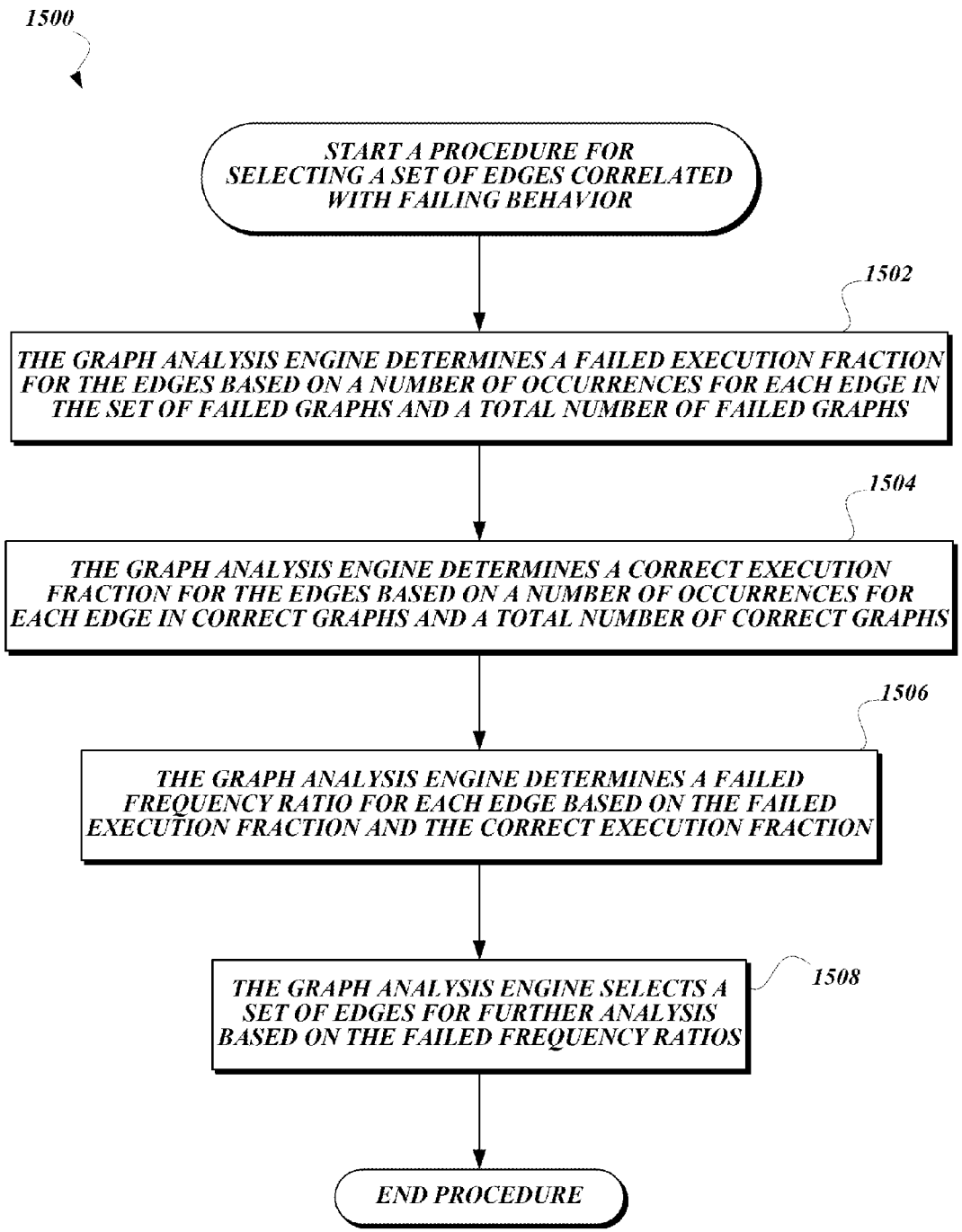
FIG. 15 illustrates one embodiment of a procedure for selecting a set of edges correlated with failed behavior according to various aspects of the present disclosure.

FIG. 15 illustrates one embodiment of a procedure 1500 executed at block 1306 of FIG. 13 for selecting a set of edges correlated with failed behavior according to various aspects of the present disclosure. Briefly stated, the procedure 1500 selects edges from the communication graphs that appear more often in failed communication graphs than in correct communication graphs. From a start block, the procedure 1500 proceeds to block 1502, where the graph analysis engine determines a failed execution fraction for the edges of the communication graphs based on a number of occurrences of the edges in the set of failed communication graphs and a total number of failed executions. In some embodiments, the failed execution fraction for a given edge may be expressed by the following equation, wherein $Frac_f$ is the failed execution fraction for the edge, $EdgeFreq_f$ is the number of failed communication graphs in which the edge appears, and $\#Runs_f$ is the total number of failed communication graphs.

$$Frac_f = \frac{EdgeFreq_f}{\# Runs_f} \quad (1)$$

At block 1504, the graph analysis engine determines a correct execution fraction for the edges of the communication graphs based on a number of occurrences of the edges in the set of correct communication graphs and a total number of correct communication graphs. In some embodiments, the correct execution fraction for a given edge may be expressed by the following equation, wherein $Frac_c$ is the correct execution fraction for the edge, $EdgeFreq_c$ is the number of correct communication graphs in which the edge appears, and $\#Runs_c$ is the total number correct communication graphs.

$$Frac_c = \frac{EdgeFreq_c}{\# Runs_c} \quad (2)$$

Next, at block 1506, the graph analysis engine determines a failed frequency ratio for the edges of the communication graphs based on the failed execution fraction and the correct execution fraction. In some embodiments, the failed frequency ratio for a given edge may be expressed by the following equation, wherein F is the failed frequency ratio:

$$F = \frac{Frac_f}{Frac_c} \quad (3)$$

In some embodiments, edges having a $Frac_c$ of zero may be particularly likely to be associated with failures, but would cause Function 3 above to be undefined. In such cases, the $Frac_c$ value may be replaced by a value that yields a large value for F. For example, in some embodiments, a $Frac_c$ of zero may be replaced by the following value:

$$Frac_c = \frac{1}{\# Runs_c + 1} \quad (4)$$

The procedure 1500 then proceeds to block 1508, where the graph analysis engine selects a set of edges for further analysis based on the failed frequency ratios. In some embodiments, the graph analysis engine may select a predetermined number of edges having the highest failed frequency ratios. In some embodiments, the graph analysis engine may select edges having a failed frequency ratio greater than a threshold value. The procedure 1500 then proceeds to an end block and terminates.

Figure 16:
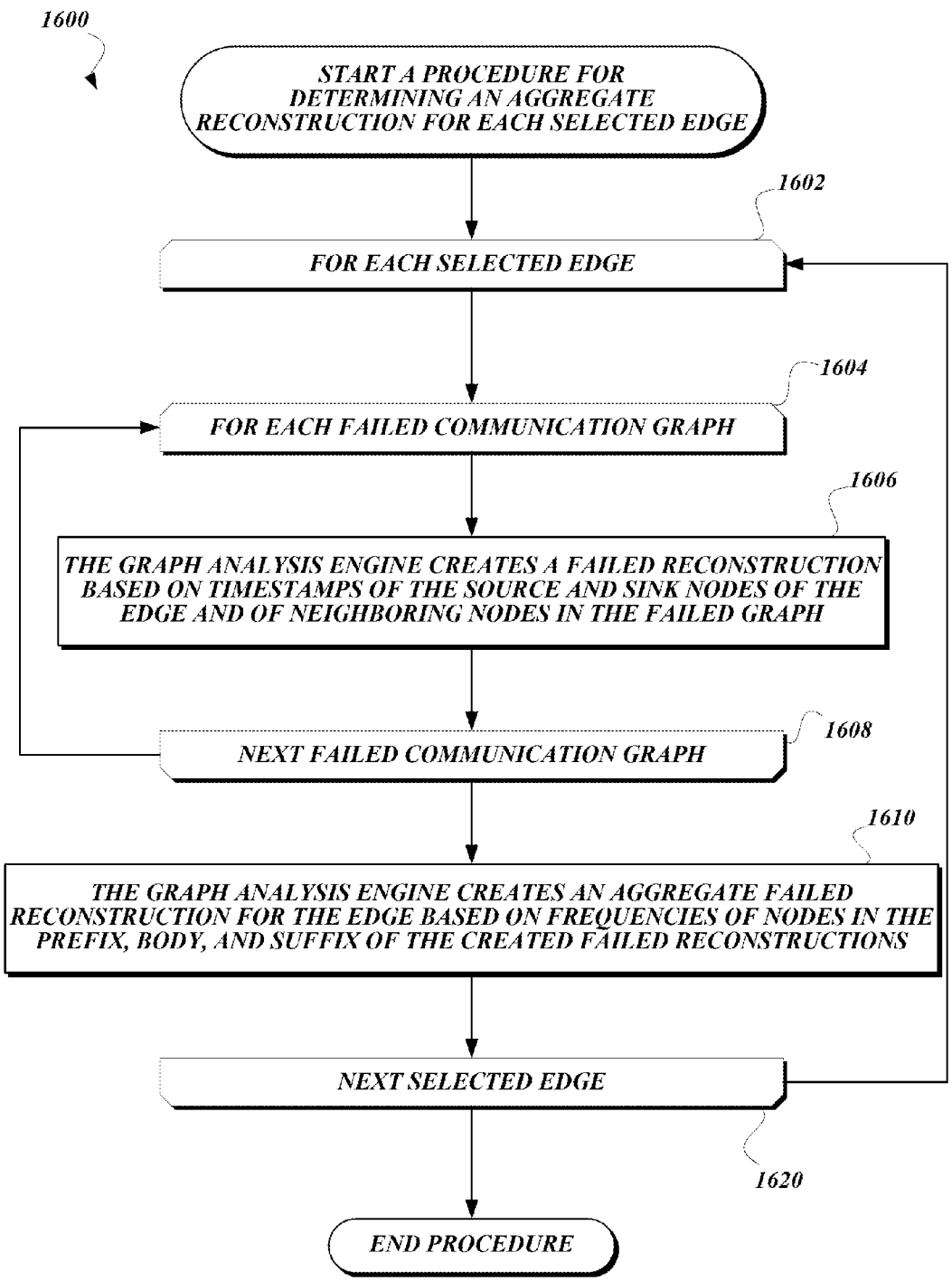
FIG. 16 illustrates one embodiment of a procedure for determining an aggregate reconstruction for each selected edge according to various aspects of the present disclosure.

Returning now to FIG. 13, the method 1300 proceeds to block 1308, where a procedure is performed wherein the graph analysis engine determines an aggregate reconstruction for each selected edge. In some embodiments, the aggregate reconstruction may be calculated for failed communication graphs in order to determine sets of likely nodes that co-occur with failed behavior. FIG. 16 illustrates one embodiment of a procedure 1600 executed at block 1308 of FIG. 13 for determining an aggregate reconstruction for each selected edge according to various aspects of the present disclosure. From a start block, the procedure 1600 proceeds to a for loop between a for loop start block 1602 and a for loop end block 1620, wherein the for loop executes once for each selected edge to create an aggregate reconstruction for each selected edge.

From the for loop start block 1602, the procedure 1600 proceeds to another for loop between a for loop start block 1604 and a for loop end block 1608, wherein the for loop executes once for each failed communication graph containing the selected edge to create reconstructions for the selected edge for each failed communication graph. From the for loop start block 1604, the procedure 1600 proceeds to block 1606, where the graph analysis engine creates a failed reconstruction based on timestamps of the source node and the sink node of the selected edge in the failed communication graph, as well as timestamps of neighboring nodes in the failed communication graph. As discussed above with respect to FIGURE KK, the failed reconstruction may be built by selecting nodes having timestamps between the timestamp of the source node and sink node of the edge, a predetermined number of nodes having timestamps before the timestamp of the source node, and a predetermined number of nodes having timestamps after the timestamp of the sink node.

The procedure 1600 then proceeds to the for loop end block 1608 and determines whether the for loop should be executed again. If so, the procedure 1600 returns to the for loop start block 1604 and calculates a failed reconstruction for another failed communication graph. If not, the procedure 1600 proceeds to block 1610, where the graph analysis engine creates an aggregate failed reconstruction for the selected edge based on frequencies of nodes in the prefix, body, and suffix of the created failed reconstructions. In some embodiments, the aggregate failed reconstruction for the selected edge may be built using a method similar to the construction of the aggregate reconstruction illustrated and described in FIG. 12.

The procedure 1600 then proceeds to the for loop end block 1620 and determines whether the for loop should be executed again. If so, the procedure 1600 returns to the for loop start block 1602 and calculates an aggregate reconstruction for the next selected edge. If not, the procedure 1600 proceeds to an end block and terminates.

Returning now to FIG. 13, the method 1300 proceeds to block 1310, where the graph analysis engine determines a reconstruction consistency for each aggregate reconstruction. In some embodiments, a reconstruction consistency represents a combined confidence value over all nodes in an aggregate reconstruction. In an aggregate reconstruction produced from a set of failed communication graphs, nodes having high confidence values occur consistently in the same region of the reconstructions, and are therefore likely to be related to the failed behavior. Hence, reconstructions containing many high confidence nodes may reflect a correlation between the co-occurrence of the instructions contained in the nodes in the order shown by the reconstruction and the occurrence of failures. In some embodiments, a reconstruction consistency may be determined by combining total average confidence values for the nodes in each reconstruction region. For example, a reconstruction consistency R for a reconstruction having a prefix region P, a body B, and a suffix S, may be represented by the following equation, wherein V(n,r) is the confidence value of node n in region r.

$$R = \frac{\sum_{p \in P} V(p, P) + \sum_{b \in B} V(b, B) + \sum_{s \in S} V(s, S)}{|P| + |B| + |S|} \quad (5)$$

Figure 17:
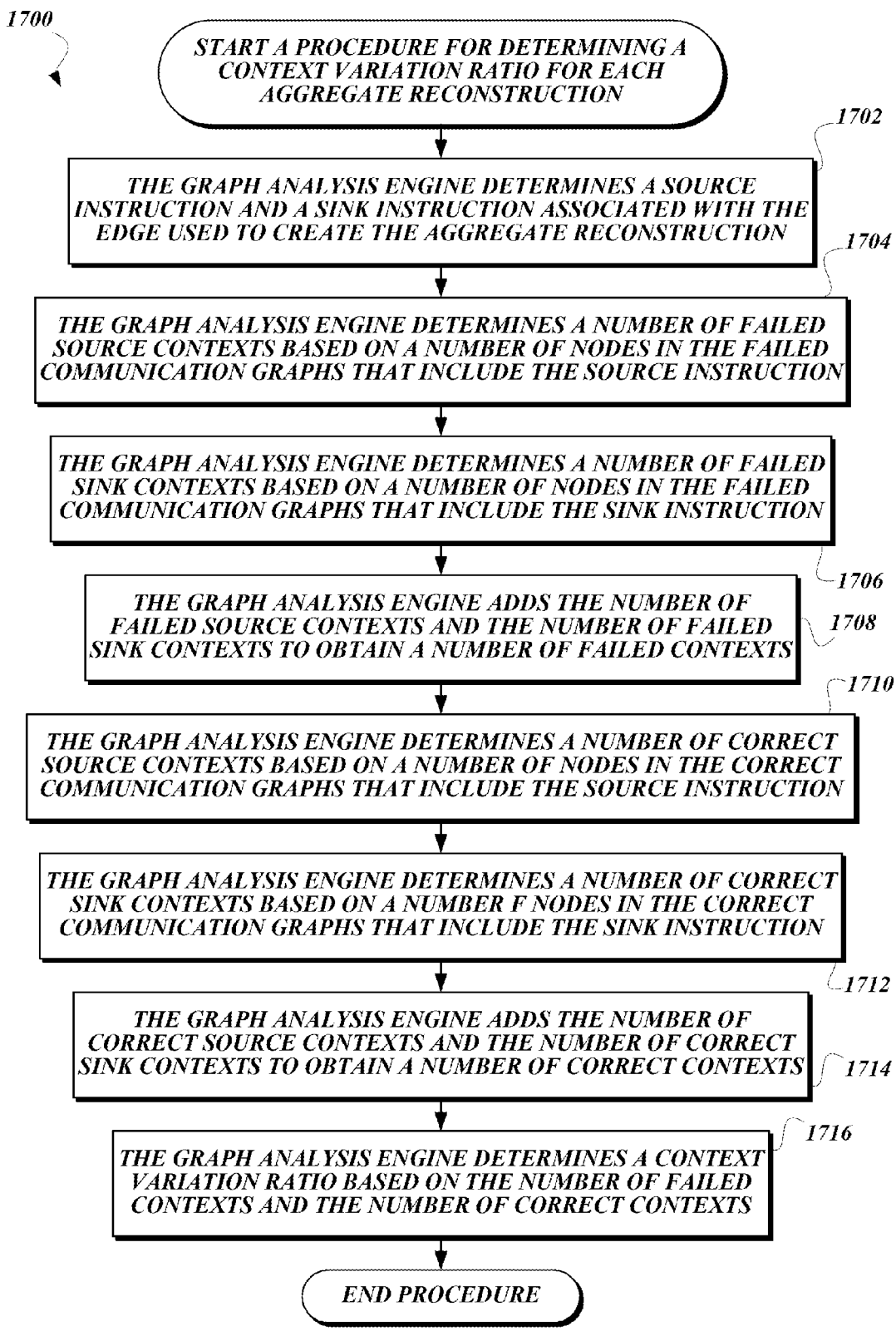
FIG. 17 illustrates one embodiment of a procedure for determining a context variation ratio for each aggregate reconstruction according to various aspects of the present disclosure.

At block 1312, a procedure is performed wherein the graph analysis engine determines a difference in interleaving around the edge in failed communication graphs versus correct communication graphs. In some embodiments, the difference in interleaving may be represented by a context variation ratio, which is based on a comparison of a number of contexts in which either the source instruction or the sink instruction communicate in failed communication graphs versus correct communication graphs. Large differences between the number of contexts in correct communication graphs compared to failed communication graphs may be correlated with failures. FIG. 17 illustrates one embodiment of a procedure 1700 executed at block 1312 of FIG. 13 for determining a context variation ratio for each aggregate reconstruction.

From a start block, the procedure 1700 proceeds to block 1702, where the graph analysis engine determines a source instruction and a sink instruction associated with the edge used to create the aggregate reconstruction. Next, at block 1704, the graph analysis engine determines a number of failed source contexts based on a number of nodes in the failed communication graphs that include the source instruction. The failed source contexts may include contexts from any node wherein the source instruction appears, whether the node is a source node or a sink node. The procedure 1700 proceeds to block 1706, where the graph analysis engine determines a number of failed sink contexts based on a number of nodes in the failed communication graphs that include the sink instruction. Again, the failed sink contexts may include contexts from any node wherein the sink instruction appears. Next, at block 1708, the graph analysis engine adds the number of failed source contexts and the number of failed sink contexts to obtain a number of failed contexts. The number of failed contexts represents a count of the contexts in which either the source instruction or the sink instruction communicates as represented by the failed communication graphs.

The procedure 1700 proceeds to block 1710, where the graph analysis engine determines a number of correct source contexts based on a number of nodes in the correct communication graphs that include the source instruction. At block 1712, the graph analysis engine determines a number of correct sink contexts based on a number of nodes in the correct communication graphs that include the sink instruction. As discussed above, the source contexts and sink contexts include nodes wherein the source instruction or sink instruction, respectively, are present in either a source node or sink node. The procedure 1700 proceeds to block 1714, where the graph analysis engine adds the number of correct source contexts and the number of correct sink contexts to obtain a number of correct contexts.

At block 1716, the graph analysis engine determines a context variation ratio based on the number of failed contexts and the number of correct contexts. The procedure 1700 then proceeds to an end block and terminates. In some embodiments, the context variation ratio C may be represented by the following equation, wherein $\#Ctx_f$ is the number of failed contexts and $\#Ctx_c$ is the number of correct contexts.

$$C = \frac{|\#Ctx_f - \#Ctx_c|}{\#Ctx_f + \#Ctx_c} \quad (6)$$

Returning now to FIG. 13, the method 1300 proceeds to block 1314, where the graph analysis engine ranks each aggregate reconstruction based on one or more of the reconstruction consistency, the context variation ratio, and the failed frequency ratio. In some embodiments, the reconstruction consistency, the context variation ratio, and the failed frequency ratio may be useful separately or individually to rank aggregate reconstructions for finding aggregate reconstructions that accurately represent failed executions. In some embodiments, two or more of the reconstruction consistency, the context variation ratio, and the failed frequency ratio may be combined to rank each aggregate reconstruction to allow the strengths of each score to complement each other. In some embodiments, the reconstruction consistency, the context variation ratio, and the failed frequency ratio may be multiplied together to produce a score for ranking each aggregate reconstruction. At block 1316, the graph analysis engine presents one or more highly ranked aggregate reconstructions for debugging. The top ranked aggregate reconstructions are likely to accurately represent failed executions, and so the error should be easily diagnosed by the developer once presented with the top ranked aggregate reconstructions. The method 1300 then proceeds to an end block and terminates.

Figure 18:
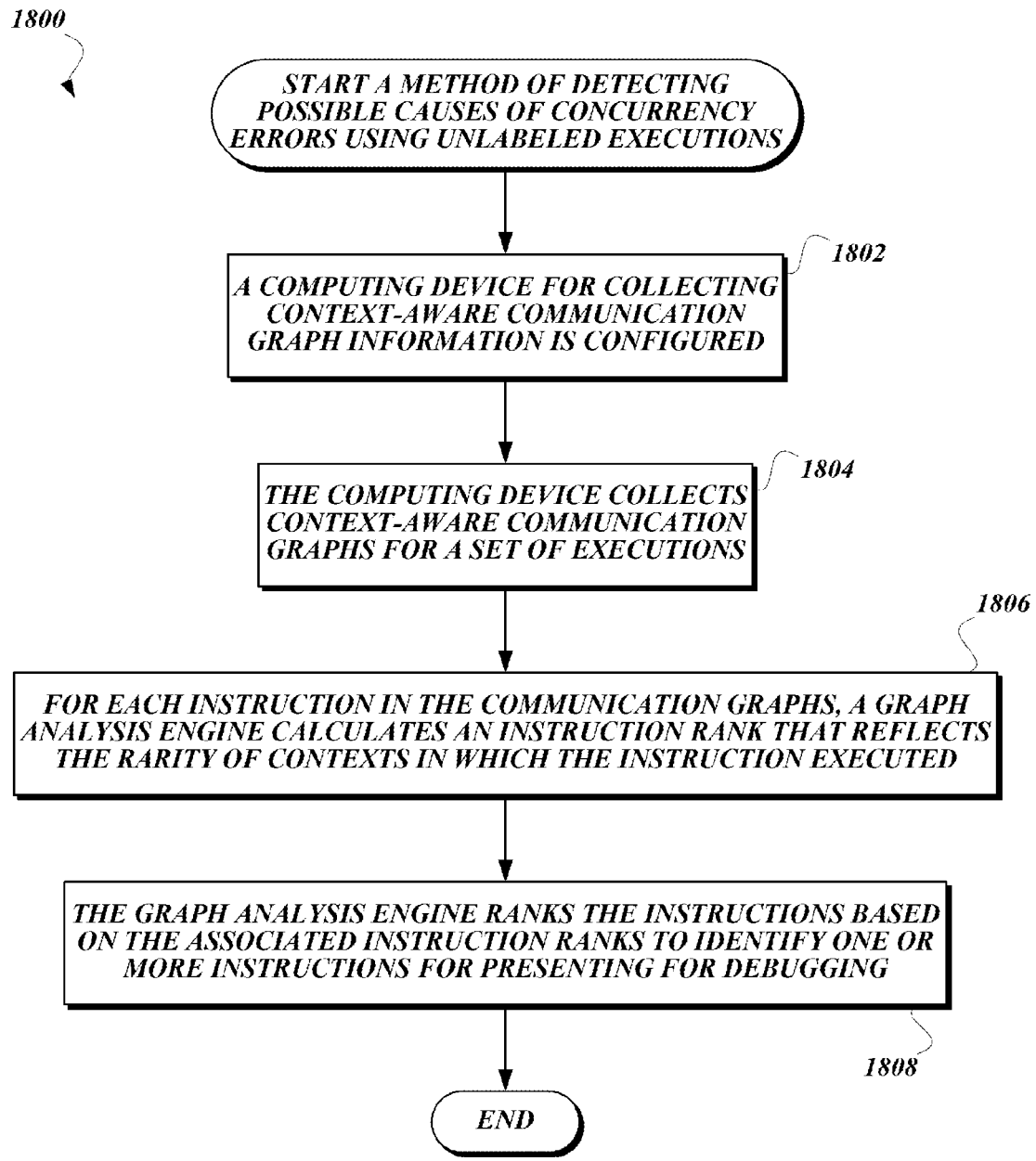
FIG. 18 illustrates one embodiment of a method of detecting possible causes of concurrency errors using unlabeled executions according to various aspects of the present disclosure.

The method 1300 illustrated and discussed above relates to cases in which failed executions are distinguished from correct executions. However, similar techniques for analyzing context-aware communication graphs to find possible causes of concurrency errors using executions which are not known to be failed or correct may also be useful. FIG. 18 illustrates one embodiment of a method 1800 of detecting possible causes of concurrency errors using such unlabeled executions. From a start block, the method 1800 proceeds to block 1802, where a computing device for collecting context-aware communication graph information is configured. As discussed above, the computing device may be a hardware-instrumented computing device 700, a software-instrumented computing device 400, or any other suitably configured computing device. At block 1804, the computing device collects context-aware communication graphs for a set of executions. Unlike the method 1300 discussed above, the executions or communication graphs are not labeled as correct or failed. Next, at block 1806, for each instruction in the communication graphs, a graph analysis engine calculates an instruction rank that reflects the rarity of contexts in which the instruction executed. In some embodiments, the instruction rank for each instruction may be represented by the following equation, wherein $X_i$ is the set of contexts in which the instruction executed, $F_{i,x}$ a number of runs in which the instruction i executed in context x, and $F_{i,*}$ is a total number of times the instruction i executed regardless of context across all runs.

$$rank_i = \sum_{x \in X_i} \frac{F_{i,x}}{F_{i,*}} \quad (7)$$

The equation functions to rank instructions that were executed in rare contexts higher to reflect their increased likelihood of being associated with failed behavior. At block 1808, the graph analysis engine ranks the instructions based on the associated instruction ranks to identify one or more instructions for presenting for debugging. In some embodiments, reconstructions and/or aggregate reconstructions may be built as described above based on the highly ranked instruction and/or one or more edges associated with the highly ranked instruction to make debugging easier. The method 1800 then proceeds to an end block and terminates.

One of ordinary skill in the art will recognize that the pseudocode, execution listings, and communication graphs illustrated and discussed above are exemplary only, and that actual embodiments of the present disclosure may be used to find other concurrency errors, for any suitable code listings and/or communication graphs. In some embodiments, other types of errors, such as performance bottlenecks and/or the like, may also be detected using similar systems and/or methods.

While illustrative embodiments have been illustrated and described, it will be appreciated that various changes can be made therein without departing from the spirit and scope of the claimed subject matter.

The embodiments of the invention in which an exclusive property or privilege is claimed are defined as follows:

1. A computer-implemented method of building a context-aware communication graph, the method comprising:
   detecting an access of a memory location by a first instruction of a first thread;
   updating a context associated with the first thread; and
   in response to determining that a second instruction of a second thread different from the first thread was a last thread to write to the memory location:
   adding an edge to the context-aware communication graph, the edge including the context associated with the first thread, a sink identifying the first instruction, a source identifying the second instruction, and a context associated with the second thread.

2. The computer-implemented method of claim 1, wherein the edge includes a timestamp of execution of the source instruction and a timestamp of execution of the sink instruction.

3. The computer-implemented method of claim 1, wherein the access of the memory location is a write, wherein updating the context associated with the first thread includes adding a local write indicator to the context of the first thread, and wherein the method further comprises adding a remote write indicator to a context of at least one thread other than the first thread.

4. The computer-implemented method of claim 3, wherein adding a remote write indicator to a context of at least one other thread other than the first thread includes adding a remote write indicator to a context of at least one thread other than the first thread that read the memory location since the last write.

5. The computer-implemented method of claim 3, further comprising clearing a list of threads that have read the memory location since the previous last write.

6. The computer-implemented method of claim 1, wherein the access of the memory location is a read, wherein updating the context associated with the first thread includes adding a local read indicator to the context of the first thread, and wherein the method further comprises adding a remote read indicator to a context of a last thread to write to the memory location.

7. The computer-implemented method of claim 6, further comprising adding the first thread to a list of threads that have read the memory location since the last write.

8. The computer-implemented method of claim 1, wherein updating a context associated with the first thread includes pushing an indicator onto a FIFO context queue associated with the first thread.

9. The computer-implemented method of claim 8, wherein the FIFO context queue has a predetermined length.

10. A computing device configured to build a context-aware communication graph by:
    detecting an access of a memory location by a first instruction of a first thread;
    updating a context associated with the first thread; and in response to determining that a second instruction of a second thread different from the first thread was a last thread to write to the memory location:
  adding an edge to the context-aware communication graph, the edge including the context associated with the first thread, a sink identifying the first instruction, a source identifying the second instruction, and a context associated with the second thread.

11. The computing device of claim 10, wherein the edge includes a timestamp of execution of the source instruction and a timestamp of execution of the sink instruction.

12. The computing device of claim 10, wherein the access of the memory location is a write, wherein updating the context associated with the first thread includes adding a local write indicator to the context of the first thread, and wherein the computing device is further configured to add a remote write indicator to a context of at least one thread other than the first thread.

13. The computing device of claim 12, wherein adding a remote write indicator to a context of at least one other thread other than the first thread includes adding a remote write indicator to a context of at least one thread other than the first thread that read the memory location since the last write.

14. The computing device of claim 12, wherein the computing device is further configured to clear a list of threads that have read the memory location since the previous last write.

15. The computing device of claim 10, wherein the access of the memory location is a read, wherein updating the context associated with the first thread includes adding a local read indicator to the context of the first thread, and wherein the computing device is further configured to add a remote read indicator to a context of a last thread to write to the memory location.

16. The computing device of claim 15, wherein the computing device is further configured to add the first thread to a list of threads that have read the memory location since the last write.

17. The computing device of claim 10, wherein updating a context associated with the first thread includes pushing an indicator onto a FIFO context queue associated with the first thread.

18. The computing device of claim 17, wherein the FIFO context queue has a predetermined length.

19. A nontransitory computer readable medium having computer-executable instructions stored thereon that, in response to execution by one or more processors of a computing device, cause the computing device to perform actions for building a context-aware communication graph, the method comprising:
  detecting an access of a memory location by a first instruction of a first thread;
  updating a context associated with the first thread; and
  in response to determining that a second instruction of a second thread different from the first thread was a last thread to write to the memory location:
    adding an edge to the context-aware communication graph, the edge including the context associated with the first thread, a sink identifying the first instruction, a source identifying the second instruction, and a context associated with the second thread.

* * * * *